(12) United States Patent
Ikeda

(10) Patent No.: US 10,425,584 B2
(45) Date of Patent: Sep. 24, 2019

(54) IMAGE PICKUP SYSTEM, CONTROL METHOD THEREOF, IMAGE PICKUP APPARATUS, AND LENS DEVICE

(71) Applicant: CANON KABUSHIKI KAISHA, Tokyo (JP)

(72) Inventor: Shunichiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 80 days.

(21) Appl. No.: 15/429,623

(22) Filed: Feb. 10, 2017

(65) Prior Publication Data

US 2017/0251146 A1    Aug. 31, 2017

(30) Foreign Application Priority Data

Feb. 26, 2016  (JP) .................................. 2016-034984

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/23209* (2013.01); *H04N 5/23251* (2013.01); *H04N 5/23258* (2013.01); *H04N 5/23267* (2013.01)

(58) Field of Classification Search
CPC .......... H04N 5/23287; H04N 5/23267; H04N 5/23258; H04N 5/23251; H04N 5/23209
See application file for complete search history.

(56) References Cited

U.S. PATENT DOCUMENTS

| 9,185,297 B2 | 11/2015 | Yamazaki | |
| 2006/0110147 A1* | 5/2006 | Tomita | H04N 5/23212 396/55 |
| 2009/0316010 A1* | 12/2009 | Nomura | G03B 5/00 348/208.6 |
| 2011/0096200 A1* | 4/2011 | Shibuno | G03B 13/36 348/231.99 |

(Continued)

FOREIGN PATENT DOCUMENTS

| JP | 2014-039131 A | 2/2014 |
| JP | 2015-141391 A | 8/2015 |

*Primary Examiner* — Abdelaaziz Tissire
(74) *Attorney, Agent, or Firm* — Cowan, Liebowitz & Latman, P.C.

(57) ABSTRACT

An image pickup system includes a camera body and a lens device that is attached to the camera body. In the lens device, a shake detecting unit detects a shake, and a splitting unit splits a degree of image blurring correction which is calculated on the basis of the shake into a degree of optical image blurring correction and a degree of electronic image blurring correction. In the first image blurring correction, driving of an image blurring correcting unit is controlled using the degree of optical image blurring correction. In the second image blurring correction, an electronic image blurring correction control unit of the camera body performs image blurring correction through image processing using the degree of electronic image blurring correction. The camera body transmits timing information on an exposure period and information on a correction range of the electronic image blurring correction to the lens device. The lens device transmits the degree of electronic image blurring correction calculated by the splitting unit to the camera body.

19 Claims, 14 Drawing Sheets

(56) References Cited

U.S. PATENT DOCUMENTS

| | | | |
|---|---|---|---|
| 2013/0063615 A1* | 3/2013 | Takeuchi | H04N 5/23258 348/208.5 |
| 2013/0155262 A1* | 6/2013 | Katoh | H04N 5/23267 348/208.5 |
| 2014/0049658 A1* | 2/2014 | Yamazaki | H04N 5/23254 348/208.11 |
| 2014/0267807 A1* | 9/2014 | Miyahara | H04N 5/23245 348/208.3 |
| 2015/0281581 A1* | 10/2015 | Sakurai | H04N 5/23287 348/208.2 |
| 2016/0182828 A1* | 6/2016 | Ikeda | H04N 5/23245 348/208.5 |
| 2016/0261806 A1* | 9/2016 | Honjo | H04N 5/23209 |
| 2016/0269640 A1* | 9/2016 | Watanabe | H04N 5/23267 |
| 2016/0330378 A1 | 11/2016 | Tsuchiya | |
| 2017/0257574 A1* | 9/2017 | Honjo | H04N 5/23287 |
| 2017/0272656 A1* | 9/2017 | Kurata | H04N 5/23267 |
| 2018/0063437 A1* | 3/2018 | Ikeda | H04N 5/23254 |

* cited by examiner

IMAGE PICKUP SYSTEM, CONTROL METHOD THEREOF, IMAGE PICKUP APPARATUS, AND LENS DEVICE

BACKGROUND OF THE INVENTION

Field of the Invention

The present invention relates to a technique for reducing image blurring or image distortion in an image pickup system including a lens device and a device body which communicate with each other.

Description of the Related Art

A technique of detecting a shake applied to an image pickup apparatus and correcting image blurring due to the shake is known. Image blurring correction by moving an image blurring correcting lens depending on the detected shake is referred to as optical image blurring correction or optical blurring control. Image blurring correction of correcting blurring for a captured image at the time of capturing a moving image by excising a part of a captured image depending on the detected shake is referred to as electronic image blurring correction or electronic blurring control.

Recently, a technique of enhancing an image blurring correction effect for large image blurring due to walking shots or the like by particularly widening an image blurring correction range on a wide side (a wide angle side) at the time of capturing a moving image is also known. By using the optical image blurring correction and the electronic image blurring correction together, it is possible to achieve a greater correction effect and to cope with larger image blurring.

On the other hand, in an interchangeable lens type camera system, a configuration in which a lens device attached to a camera body includes an optical image blurring correcting mechanism and the camera body includes an optical image blurring correcting unit or an electronic image blurring correcting unit is considered. That is, such a camera system is a system in which the lens device and the camera body are combined to perform independent blurring correction. In such a system, a technique in which the lens device and the camera body do not independently control image blurring but controls the image blurring in cooperation by communication with each other to enhance a correction effect is disclosed. Japanese Patent Laid-Open No. 2014-39131 discloses a technique in which the camera body transmits exposure time (shutter speed) information to a lens unit and a plurality detection timings of an image blurring correcting unit are determined on the basis of the shutter speed information. Japanese Patent Laid-Open No. 2015-141391 discloses a technique in which a camera body and a lens unit perform blurring correction on the basis of blurring correction rates thereof.

In an interchangeable lens type camera system, in order to cope with combinations of various interchangeable lenses and a camera body, it is necessary to perform control without recognizing individual lens specifications or camera specifications. When a communication traffic volume and a communicating frequency are great between the camera body and the lens device, there is a possibility that processing will not be completed within a prescribed time and it is thus necessary to communicate with a smaller communication traffic volume at a matched control timing.

In Japanese Patent Laid-Open No. 2014-39131, it is disclosed that the shutter speed information is transmitted in synchronization with a vertical synchronization timing and that the lens device holds a sampling table to determine a sampling timing depending on an exposure time. However, the sampling timing suitable for rolling shutter distortion correction is not uniquely determined depending on the exposure time, but may vary depending on specifications or a photographing mode of an imaging element mounted on the camera body. Accordingly, it is difficult to cope with various camera specifications.

SUMMARY OF THE INVENTION

In Japanese Patent Laid-Open No. 2015-141391, the blurring correction is performed on the basis of the blurring correction rates of the camera body and the lens unit. However, when only the blurring correction rates are used, it is necessary to mount angular velocity sensors with the same correction axes (a yaw direction and a pitch direction) as in the lens unit on the camera body. In addition, there is a possibility that a difference in gyro sensitivity between the camera body and the lens unit will affect blurring control accuracy and it is difficult to cope with various camera or lens specifications.

The present invention is directed to controlling of image correction in cooperation of a plurality of correction units in an image pickup system including a lens device and a body of an image pickup apparatus which communicate with each other.

According to an aspect of the present invention, there is provided an image pickup system including a body of an image pickup apparatus and a lens device, the lens device including a first communication unit configured to communicate with the body, a detection unit configured to detect a shake, a first correction unit configured to correct image blurring due to the shake, and a first control unit configured to acquire information on the shake detected by the detection unit and to control the first correction unit. The body includes an imaging unit, a second communication unit configured to communicate with the lens device, a second correction unit configured to correct image blurring due to the shake or image distortion, and a second control unit configured to control the second correction unit. The second control unit performs control of transmitting timing information on an exposure period of the imaging unit to the first control unit via the second communication unit. The first control unit receives the timing information from the second control unit via the first communication unit and performs control of calculating a degree of correction in the first correction unit and a degree of correction in the second correction unit and transmitting the degree of correction in the second correction unit to the second control unit. The second control unit receives the degree of correction in the second correction unit from the first control unit via the second communication unit and controls the second correction unit.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. First, common items of the embodiments will be described.

Figure 1:
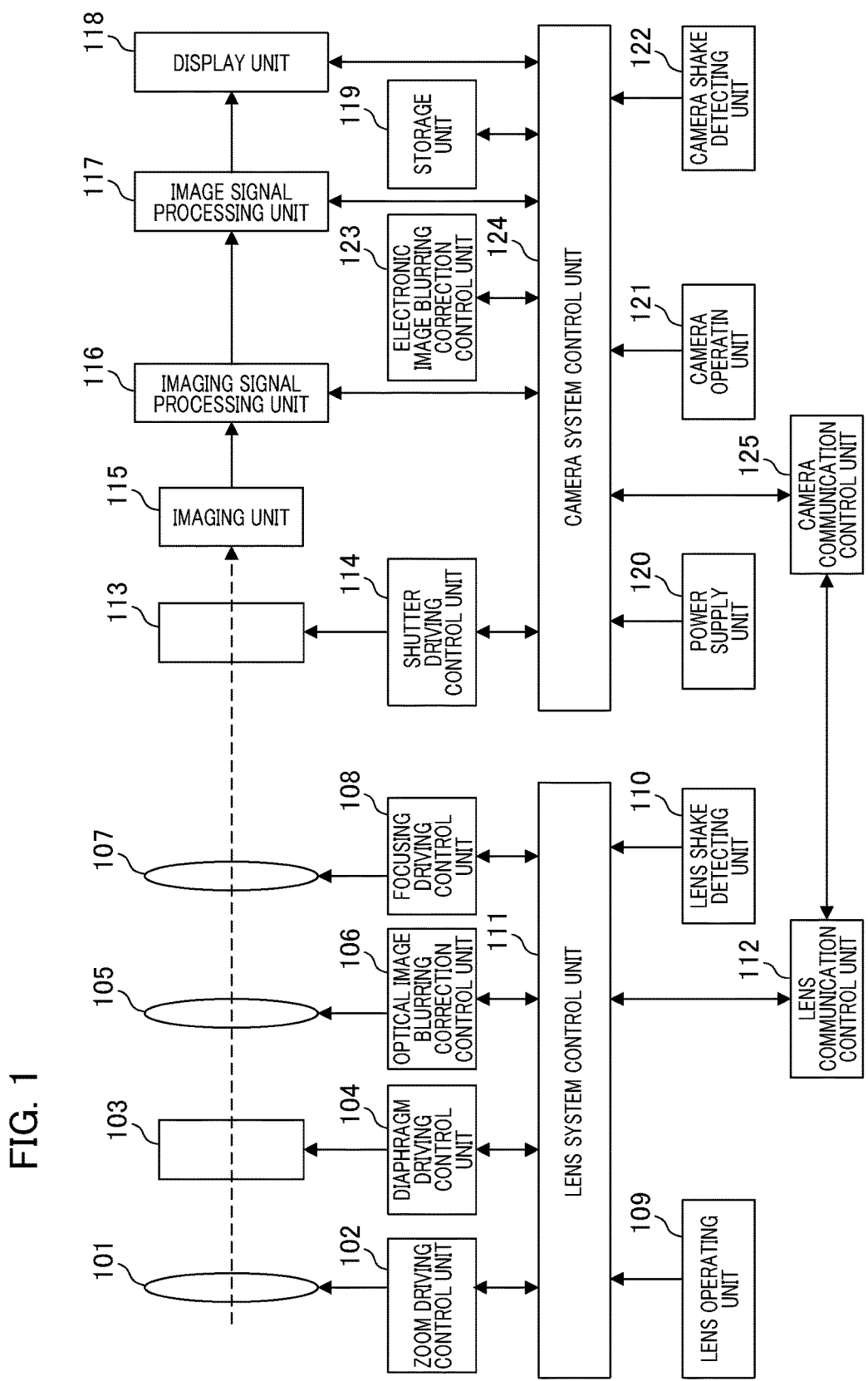
FIG. 1 is a block diagram illustrating an example of a configuration of an image pickup system according to an exemplary embodiment of the present invention.

FIG. 1 is a block diagram illustrating a configuration of an image pickup system according to an exemplary embodiment of the present invention. The image pickup system is an interchangeable lens type digital camera that mainly captures a still image and a moving image. The application of the present invention is not limited to the digital camera, but the present invention can be applied to various image pickup systems.

The image pickup system illustrated in FIG. 1 includes a lens device and a camera body and the lens device is attached on the camera body for use. A zoom unit 101 of the lens device includes a zoom lens that performs magnification. A zoom driving control unit 102 controls driving of the zoom unit 101. A diaphragm unit 103 has a diaphragm function. A diaphragm driving control unit 104 controls driving of the diaphragm unit 103. An image blurring correcting unit 105 includes an image blurring correcting lens (hereinafter also referred to as a correction lens) such as a shift lens. The image blurring correcting unit 105 corresponds to a first image blurring correcting unit and driving thereof is controlled by an optical image blurring correction control unit 106. A focusing unit 107 includes a focusing lens that adjusts a focus to form a subject image. A focusing driving control unit 108 controls driving of the focusing unit 107.

A lens operating unit 109 is an operation unit that is used to operate the lens device by a user. A lens shake detecting unit 110 detects a degree of shake applied to the lens device and outputs a detection signal to a lens system control unit 111. The lens system control unit (hereinafter referred to as a lens control unit) 111 that controls the entire lens device includes a central processing unit (CPU) and comprehensively controls the driving control units or the correction control units of the lens device. The lens system control unit 111 communicates with a control unit of the camera body via a lens communication control unit 112.

The camera body will be described below. The camera body includes a shutter unit 113. A shutter driving control unit 114 controls driving of the shutter unit 113. An imaging unit 115 includes an imaging element, converts a light image formed through lens groups in a photoelectrical conversion manner, and outputs an electrical signal. An imaging signal processing unit 116 converts the electrical signal output from the imaging unit 115 into an image signal. An image signal processing unit 117 processes the image signal output from the imaging signal processing unit 116 depending on usage thereof. For example, the image signal processing unit 117 changes an excision position of the image signal depending on a degree of correction in an electronic image blurring correction control unit 123. The electronic image blurring correction control unit 123 corresponds to a second image blurring correcting unit and performs image blurring correction control by excising an image. The second image blurring correction is not limited to the electronic image blurring correction, but may include, for example, image blurring correction using driving control of the imaging element and image blurring correction using driving control of a movable optical element in the camera body.

A display unit 118 displays an image as necessary on the basis of a signal output from the image signal processing unit 117. A storage unit 119 stores a variety of data such as image information. A power supply unit 120 supplies power to the entire system depending on usage. A camera operating unit 121 is an operation unit that is used to operate a camera system by a user and outputs an operation signal to a camera system control unit 124. A camera shake detecting unit 122 detects a degree of shake applied to the camera and outputs a detection signal to the camera system control unit 124. The camera system control unit (hereinafter referred to as a camera control unit) 124 includes a CPU and comprehensively controls the entire camera system. The camera control unit 124 communicates with the lens communication control unit 112 of the lens device via a camera communication control unit 125. That is, in a state in which the lens device is attached to the camera body and is electrically connected thereto, mutual communication is performed by the lens communication control unit 112 and the camera communication control unit 125.

Brief operations of the image pickup system having the above-mentioned configuration will be described below.

The lens operating unit 109 and the camera operating unit 121 include an image blurring correcting switch that is used to select ON/OFF of image blurring correction. When a user operates the image blurring correcting switch to turn on the image blurring correction, the lens control unit 111 or the camera control unit 124 instructs the optical image blurring correction control unit 106 or the electronic image blurring correction control unit 123 to perform the image blurring correcting operation. Until an instruction to turn off the image blurring correction is issued, the image blurring correction control units perform the image blurring correction control.

The camera operating unit 121 includes an image blurring correction mode switch for selecting a first mode and a second mode for the image blurring correction. The first mode is a mode in which the image blurring correction is performed using only optical image blurring correction (first image blurring correction). The second mode is a mode in which the image blurring correction is performed using the optical image blurring correction and the electronic image blurring correction (second image blurring correction)

together. If the first mode is selected, a reading position of the imaging unit 115 is constant and it is thus possible to cope with photographing with a wider angle by widening the reading range. If the second mode is selected, an excision range of an image signal by the image signal processing unit 117 is narrowed but it is possible to cope with larger image blurring by changing the excision position depending on the degree of image blurring correction.

The camera operating unit 121 includes a shutter release button which is configured to sequentially turn on a first switch (SW1) and a second switch (SW2) depending on a degree of pressing. When a user presses the shutter release button about halfway, the first switch SW1 is turned on. When the user presses the shutter release button fully, the second switch SW2 is turned on. By turning on the first switch SW1, the focusing driving control unit 108 drives the focusing unit 107 to adjust the focal point and the diaphragm driving control unit 104 drives the diaphragm unit 103 to set an appropriate degree of exposure. By turning on the second switch SW2, image data acquired from a light image exposed to the imaging unit 115 is stored in the storage unit 119.

The camera operating unit 121 includes a moving image recording switch. The camera starts photographing of a moving image when the moving image recording switch is pressed, and ends the recording when a user presses the moving image recording switch again during recording. When the user operates the shutter release button to turn on the first and second switches SW1 and SW2 during photographing of a moving image, a process of acquiring a still image during recording of the moving image and recording the still image is performed. The camera operating unit 121 includes a reproduction mode selecting switch for selecting a reproduction mode. If the reproduction mode is selected by operating the reproduction mode selecting switch, the camera stops a blurring control (image blurring correcting) operation.

Figure 2:
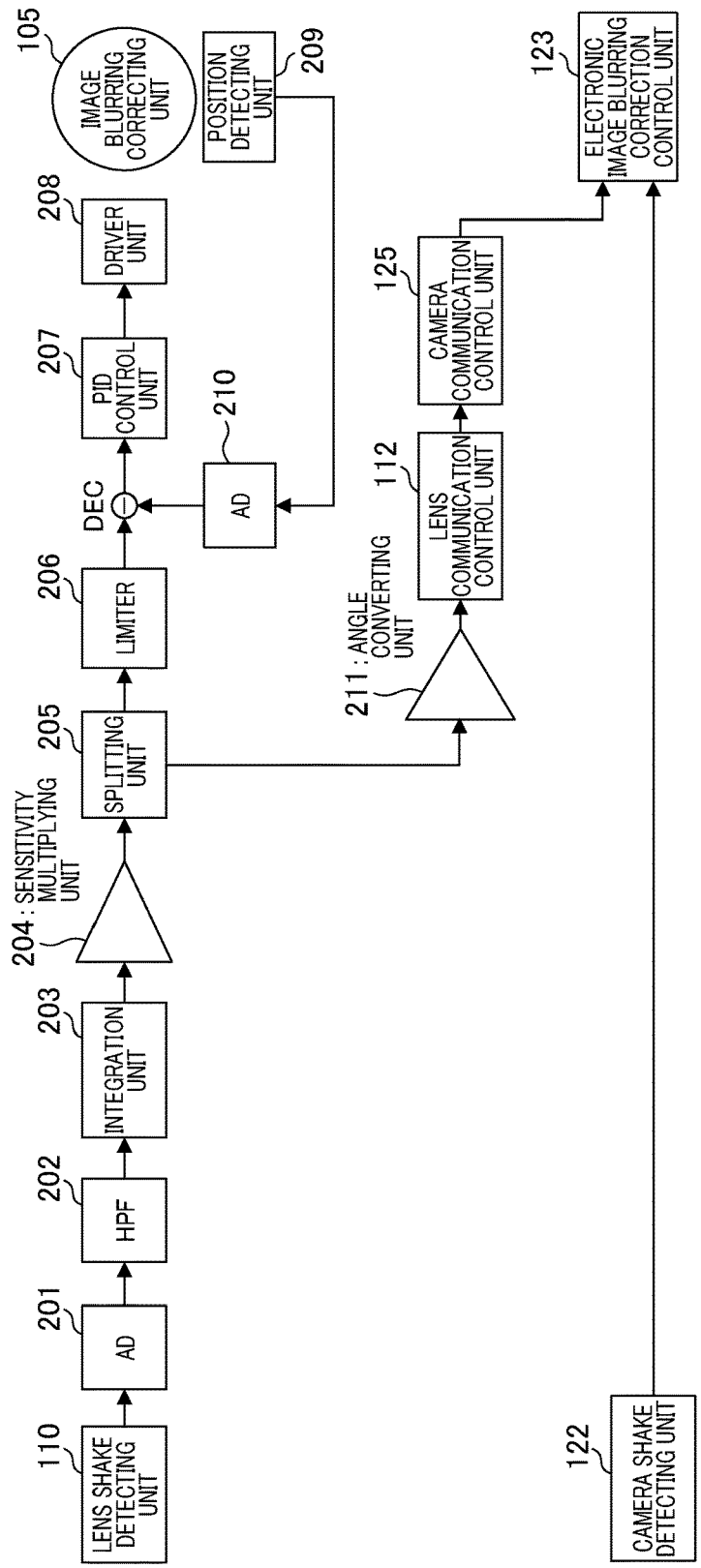
FIG. 2 is a block diagram illustrating parts associated with control of image blurring correction.
Figure 16:
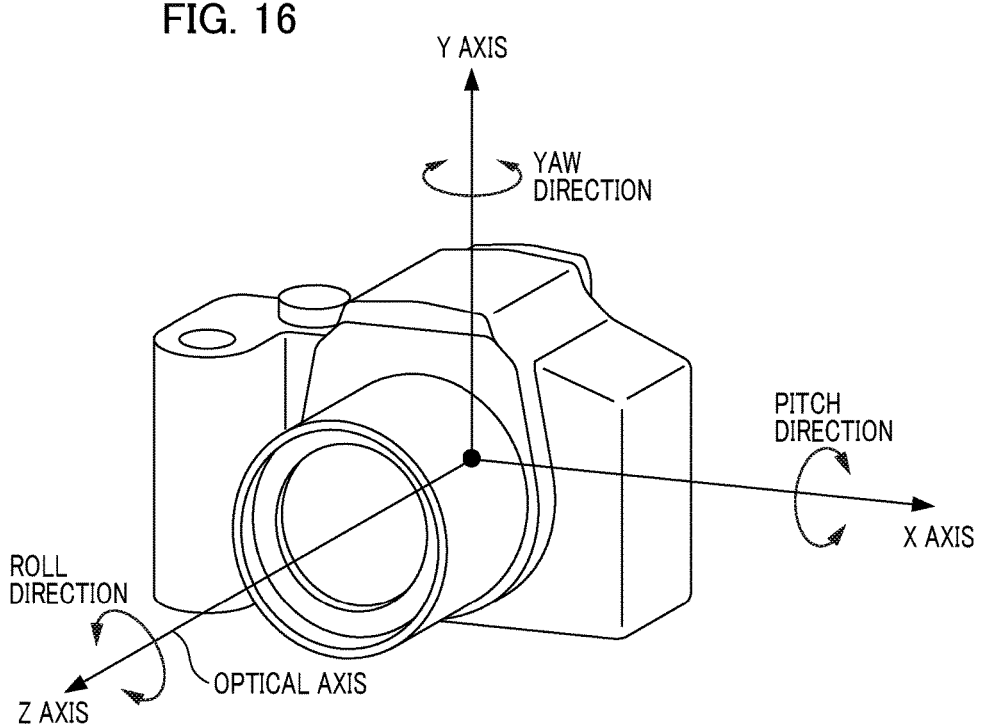
FIG. 16 is a diagram illustrating a pitch direction, a yaw direction, and a roll direction in an image pickup apparatus.

The image blurring correction control in the image pickup system will be described below with reference FIGS. 2 and 16. FIG. 2 is a block diagram illustrating parts associated with the image blurring correction control in the whole image pickup system in more detail. FIG. 16 is a diagram illustrating a pitch direction, a yaw direction, and a roll direction. The lens shake detecting unit 110 and the lens communication control unit 112 illustrated in FIG. 2 detect angular velocity data using a gyro sensor as a shake sensor and output a detection voltage. The lens shake detecting unit 110 includes a pitch-direction shake sensor and a yaw-direction shake sensor. The camera shake detecting unit 122 includes a roll-direction shake sensor. As illustrated in FIG. 16, an optical axis of an imaging optical system in the image pickup apparatus is defined as a Z axis, a vertical axis at a regular position is defined as a Y axis, and a direction perpendicular to the Y axis and the Z axis is defined as an X axis. Accordingly, the pitch direction is an X-axis rotation direction (a tilting direction), the yaw direction is a Y-axis rotation direction (a panning direction), and the roll direction is a Z-axis rotation direction (a direction in which an imaging plane rotates in a plane perpendicular to an optical axis). That is, the pitch direction is a tilting direction with respect to the horizontal plane in the vertical direction of the image pickup apparatus and the yaw direction is a tilting direction with respect to the vertical plane in the horizontal direction of the image pickup system, which are perpendicular to each other.

The pitch-direction shake sensor detects shake information based on a shake in the pitch direction. The yaw-direction shake sensor detects blurring information based on a shake in the yaw direction. The roll-direction shake sensor detects blurring information based on a shake in the rotation direction in a plane perpendicular to an optical axis. The blurring information is acquired as angular velocity data. In FIG. 2, the same configuration is applied to the pitch direction and the yaw direction and thus only one axis will be described below.

The lens shake detecting unit 110 outputs angular velocity data from an angular velocity sensor such as a gyro sensor as a detection voltage. An angular velocity detection AD conversion unit 201 converts a detection signal output from the lens shake detecting unit 110 into digital data. A high-pass filter 202 removes an offset component or a temperature drift component of the angular velocity data and outputs the resultant angular velocity data to an integration unit 203. The integration unit 203 integrates the angular velocity data by pseudo-integration using a low-pass filter and converts the integrated data into angle data. A sensitivity multiplying unit 204 for optical image blurring correction converts the angle data acquired from the integration unit 203 into a degree of driving control (a degree of shift) of an image blurring correcting lens. The value of the sensitivity is changed whenever the focal distance of an imaging optical system is changed. The sensitivity reflects a degree of correction based on adjustment of the sensitivity of the angular velocity sensor and thus absorbs sensitivity unevenness.

A splitting unit 205 splits the degree of image blurring correction output from the sensitivity multiplying unit 204 into two components. The degree of image blurring correction is split into a degree of optical image blurring correction which is applied to optical blurring correction and a degree of electronic image blurring correction which is applied to electronic blurring correction. In order to calculate the degree of optical image blurring correction, the splitting unit 205 multiplies the degree of image blurring correction by a coefficient (which is referred to as K). The coefficient K is determined by a movable range of the optical image blurring correction (which is referred to as A) and a movable range of the electronic image blurring correction (which is referred to as B) as expressed by Equation (1). The movable range is a range in which the image blurring correction can be controlled and corresponds to a range in which driving of the image blurring correcting unit 105 can be controlled in the case of the optical image blurring correction. In the case of the electronic image blurring correction, the movable range corresponds to a range in which a correcting process based on excision of an image can be performed.

$$K=A/(A+B) \quad (1)$$

Equation (1), K has a value equal to or less than 1. That is, a degree of correction of the optical image blurring correction (a first degree of image blurring correction) is calculated as the entire degree of image blurring correction by multiplication of the coefficient K.

A limiter unit 206 of the degree of optical image blurring correction fixes the first degree of image blurring correction in the movable range of the image blurring correcting unit 105. Accordingly, it is possible to prevent a state in which the correction lens reaches a movable range end (a limit position of a driving control range) for optical image blurring correction from being maintained. The output of the limiter unit 206 is input to a subtractor DEC.

A PID control unit 207 performs position control of an image blurring correcting lens in response to an input from the subtractor DEC. The position control is performed by combination of proportional (P) control, integral (I) control, and differential (D) control. A driver unit 208 supplies a current for driving the image blurring correcting unit 105 in response to a control signal from the PID control unit 207 corresponding to the first degree of image blurring correction. The image blurring correcting unit 105 includes an electromagnetic actuator by which a movable unit including the image blurring correcting lens is driven. A position detecting unit 209 detects a position of the image blurring correcting unit 105 and outputs a detection voltage. An AD conversion unit 210 converts the analog detection voltage output from the position detecting unit 209 into digital data and outputs the digital data to the subtractor DEC. The subtractor DEC calculates an output difference (deviation) between the limiter unit 206 and the AD conversion unit 210 and outputs the calculated output difference to the PID control unit 207. As a result, feedback control is performed.

On the other hand, in order to calculate the degree of electronic image blurring correction, the splitting unit 205 multiplies the degree of image blurring correction output from the sensitivity multiplying unit 204 by a coefficient "1−K." The degree of optical image blurring correction is multiplied by the coefficient K, but the degree of electronic image blurring correction is multiplied by the coefficient "1−K," whereby the degree of image blurring correction is split. An angle converting unit 211 converts the degree of electronic image blurring correction (the second degree of image blurring correction) into angle data. The conversion coefficient has a value varying depending on the focal distance and is changed whenever the focal distance is changed. The converted data is transmitted to the electronic image blurring correction control unit 123 via the lens communication control unit 112 and the camera communication control unit 125. The electronic image blurring correction control unit 123 performs electronic image blurring correction control on the basis of the second degree of image blurring correction and the degree of electronic image blurring correction based on the degree of shake acquired by the camera shake detecting unit 122. The movable range for the image blurring correction will be specifically described below with reference to FIG. 13.

Figure 13:
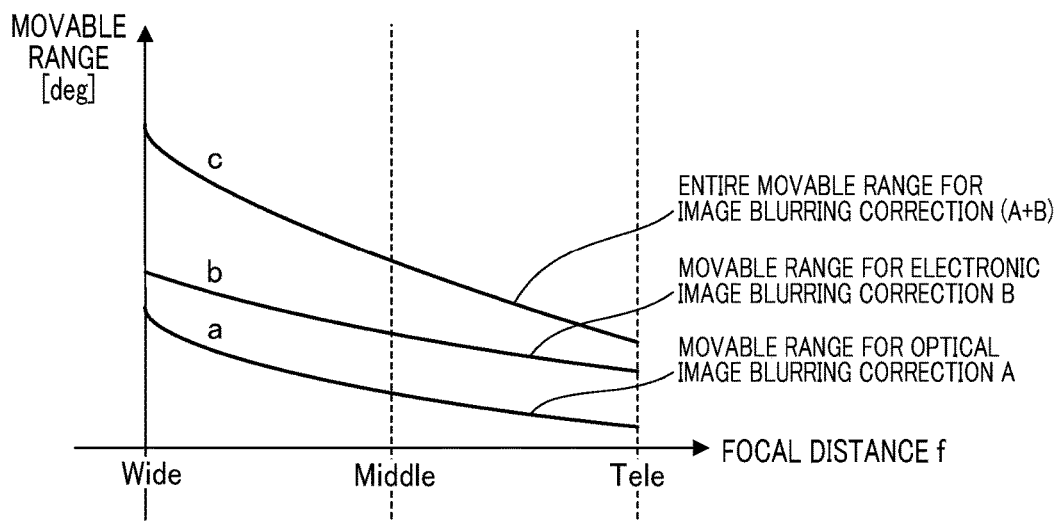
FIG. 13 is a graph illustrating a relationship between a focal distance and an image blurring correction movable range.

FIG. 13 is a graph illustrating a relationship between a focal distance of a camera and a movable range for image blurring correction. The horizontal axis represents a focal distance f, where a wide (wide angle) end, a middle (intermediate) position, and a tele (telescopic) end are marked. The vertical axis represents the movable range (unit: degree). The graph lines a, b, and c represent the movable range for optical image blurring correction A, the movable range for electronic image blurring correction B, and the entire movable range for image blurring correction A+B, respectively. That is, a relationship of a+b=c is established.

The movable range for optical image blurring correction A is determined by optical characteristics of a photographing lens, and the movable range for electronic image blurring correction B is determined by surplus pixels of an imaging element. The correction angles of the movable range for optical image blurring correction A and the movable range for electronic image blurring correction B are changed depending on a zoom state. That is, even when the same shake is applied to the camera, a degree of driving of the image blurring correcting unit 105 for correcting image blurring differs depending on a zoom position (an optical zoom magnification and a focal distance). Even when a shake of 1 degree is applied to the camera, a distance by which the shift lens of the image blurring correcting unit 105 shifts to the wide end to correct the image blurring due to the shake of 1 degree is smaller than a distance by which the shift lens shifts to the tele end. Both the movable range for optical image blurring correction A and the movable range for electronic image blurring correction B vary depending on the focal distance f, and are managed as angle-converted data in the image blurring correction control.

Figure 14:
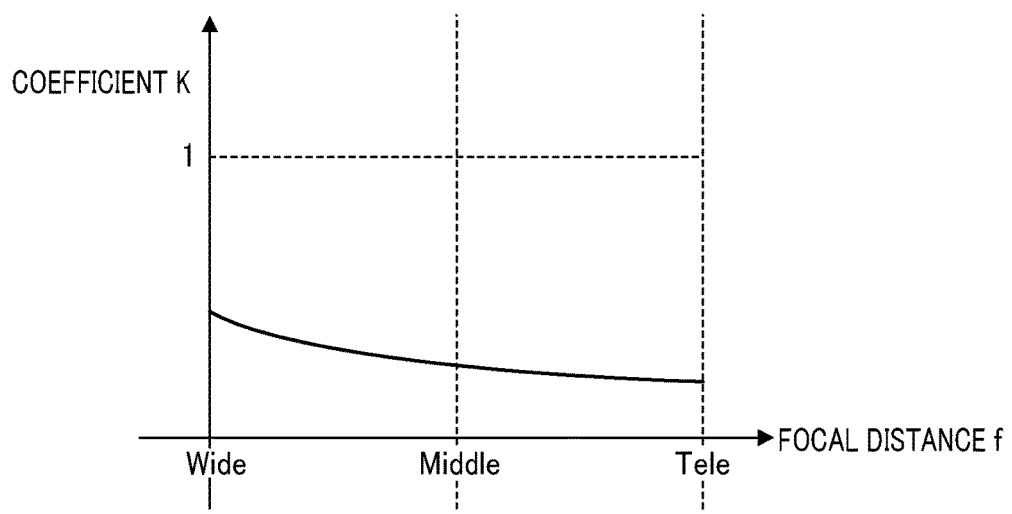
FIG. 14 is a graph illustrating a relationship between a focal distance and a split coefficient.

FIG. 14 is a graph illustrating a relationship between the focal distance and the coefficient K. Similarly to FIG. 13, the horizontal axis represents the focal distance f and the vertical axis represents the coefficient K for splitting the degree of image blurring correction. The coefficient K is determined by the movable range for optical image blurring correction A and the movable range for electronic image blurring correction B. Since the optical image blurring correction and the electronic image blurring correction are performed, a boundary of a movable end between the optical image blurring correction and the electronic image blurring correction is not present. As a result, an image artifact due to overshooting of the optical image blurring correction is suppressed.

The wide end, the middle position, and the tele end illustrated in FIG. 14 will be specifically described below. The image blurring correcting lens moves in the movable range A in the optical image blurring correction, and image processing within the movable range B is performed in the electronic image blurring correction. It is possible to correct image blurring corresponding to the entire movable range for image blurring correction using these corrections together. For example, it is assumed that the movable range for optical image blurring correction A is set to (2, 7.5, 0.3) at the wide end, the middle position, and the tele end. It is assumed that the movable range for electronic image blurring correction B is set to (2.5, 1.6, 1.1) at the wide end, the middle position, and the tele end. The unit of the movable ranges A and B is degree. In this case, the value of the coefficient K is (0.444, 0.319, and 0.214) at the wide end, the middle position, and the tele end.

If the second mode in which the optical image blurring correction and the electronic image blurring correction are performed is set, the correction lens is driven using the degree of image blurring correction which is a multiplication result of K=A/(A+B), and the excision position of an image is changed by the degree of image blurring correction which is a multiplication result of the coefficient "1−K." On the other hand, if the first mode in which only the optical image blurring correction is performed is set, the splitting unit 205 sets the value of the coefficient K to 1. That is, the driving control of the correction lens is performed using the degree of optical image blurring correction as the entire degree of image blurring correction. Since the electronic image blurring correction is not performed, the value of the coefficient "1−K" associated with the degree of electronic image blurring correction is zero.

Capturing of a still image in the second mode will be described below. When the second switch SW2 is turned on by operating the shutter release button of the camera operating unit 121, a still image exposing operation is performed. The splitting unit 205 sets the value of the coefficient K to 1. The entire degree of image blurring correction is the degree of optical image blurring correction. Since the electronic image blurring correction is not performed at the time of exposure of a still image, the value of the coefficient "1−K" associated with the degree of electronic image blurring correction is zero. At the end time of the still image exposing operation, the splitting unit 205 sets the coefficient K=A/(A+B) in the optical image blurring correction and sets the coefficient "1−K" in the electronic image blurring correction. At the start time and the end time of the still image exposing operation, in order to avoid a sudden variation of the degree of optical image blurring correction and the degree of electronic image blurring correction, a process of slowly changing a correction output with a predetermined output time is performed.

Figure 3:
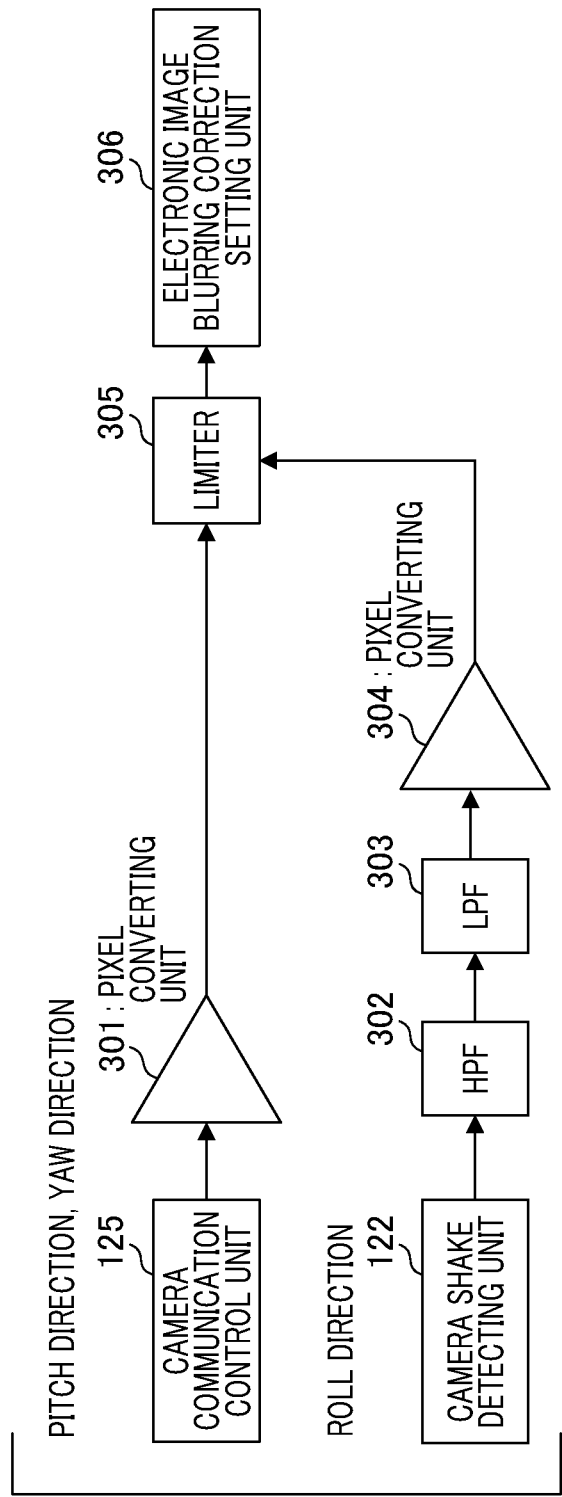
FIG. 3 is a block diagram illustrating details of an electronic image blurring correction control unit.

FIG. 3 is a block diagram illustrating a detailed configuration of the electronic image blurring correction control unit 123.

The camera communication control unit 125 receives the degree of electronic image blurring correction from the lens device by communication. The degrees of electronic image blurring correction in the pitch direction and the yaw direction are transmitted in angle-converted degrees of correction. The pixel converting unit 301 converts the degree of electronic image blurring correction into a pixel-converted degree of correction (the number of pixels) and outputs the converted degree of correction to a limiter 305. The conversion coefficient varies depending on the focal distance and is changed whenever the focal distance is changed.

The camera shake detecting unit 122 includes a gyro sensor in the roll direction and outputs a detection signal to a high-pass filter 302. The high-pass filter 302 removes an offset or drift component of the detection signal. A low-pass filter 303 cuts high-frequency noise of the detection signal. Similar to the pixel converting unit 301, a pixel converting unit 304 converts angle-converted data into a pixel-converted degree of correction and outputs the converted degree of correction to the limiter 305.

The limiter 305 clamps the degree of correction within the excision range of the electronic image blurring correction. The limiter 305 processes the outputs of the pixel converting unit 301 and the pixel converting unit 304. That is, the level of the limiter is set for each of the pitch direction, the yaw direction, and the roll direction. The limited degree of correction is input to an electronic image blurring correction setting unit 306. The electronic image blurring correction setting unit 306 sets the degrees of electronic image blurring correction in the correction axes.

(First Embodiment)

A first embodiment of the present invention will be described below.

Lens communication which is performed between the lens communication control unit 112 and the camera communication control unit 125 and a timing thereof will be described with reference to FIG. 4. In order to perform the optical image blurring correction and the electronic image blurring correction, it is necessary to transmit an exposure centroid timing (406) of the imaging unit 115 from the camera body to the lens device. However, the camera body and the lens device communicate with each other frequently for automatic focal adjustment (AF), automatic exposure (AE), or the like in addition to the image blurring correction. If the communication timing is irregular due to overlap with another communication and an accurate exposure centroid timing cannot be transmitted, there is a possibility that the processing will be hindered. Therefore, in this embodiment, the camera body transmits the exposure centroid timing to the lens device by performing the communication process in two times of a reference time and a relative time to avoid irregularity of the communication timing.

When an amount of information transmitted and received by the communication between the camera body and the lens device is large, it is difficult to complete the processing within a prescribed time. In order to cope with various interchangeable lenses, it is necessary to perform control without recognizing individual lens specifications. Therefore, in this embodiment, the lens device performs the control as a main constituent and performs communication of the angle-converted data for image blurring correction.

Figure 4:
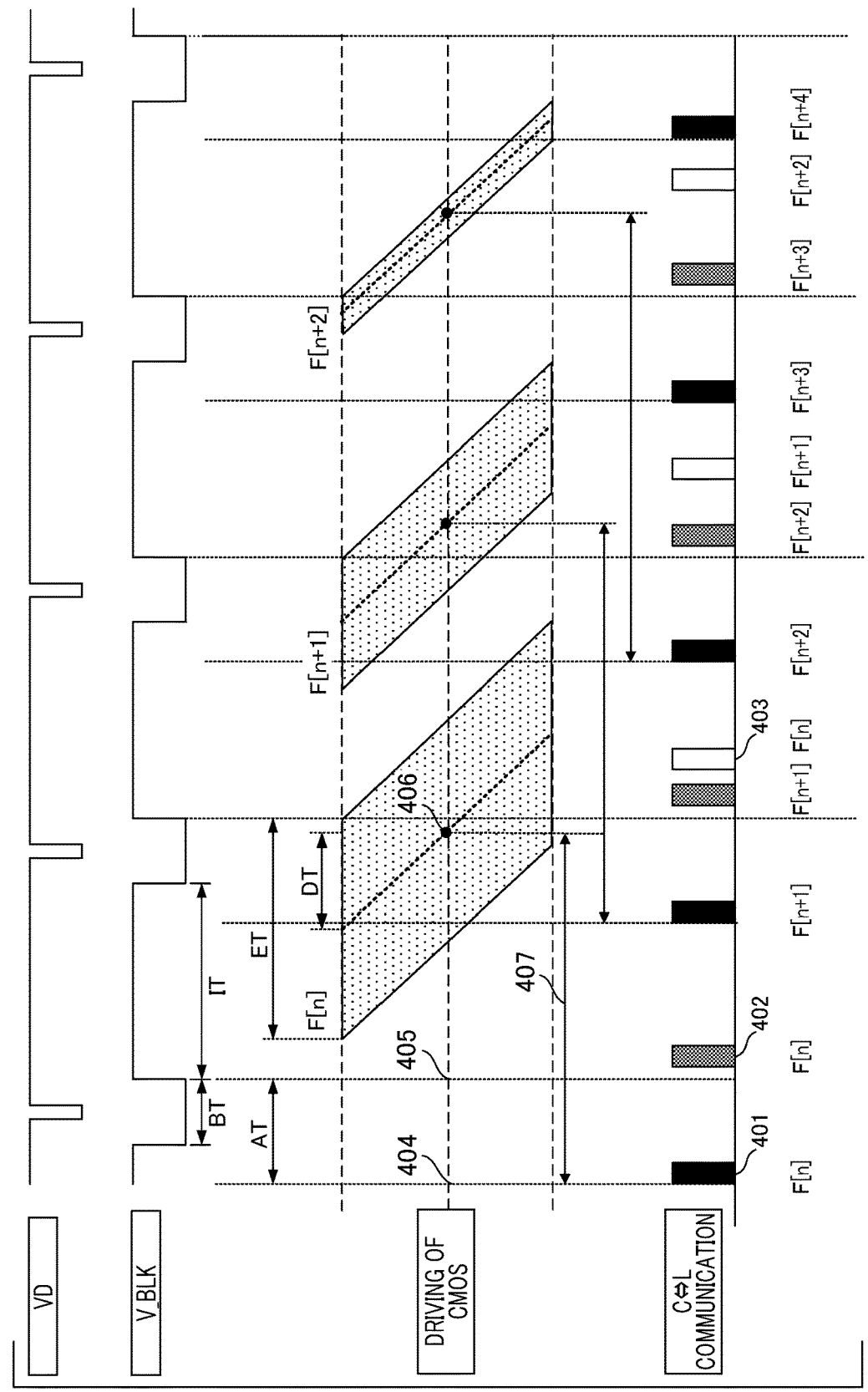
FIG. 4 is a diagram illustrating communication and timings thereof in a first embodiment.

VD in FIG. 4 indicates a timing of a vertical synchronization signal and V_BLK indicates a timing of a vertical blanking period. "CMOS driving" indicates a driving state of the imaging element and communication between the camera body (C) and the lens device (L) is illustrated at the lowermost. A communication timing 404 of first communication 401 and a timing 405 at which an exposure time is determined, and an exposure centroid timing 406 are illustrated. F[n] is an index indicating an n-th frame.

The times illustrated in FIG. 4 are as follows.

BT: length of a vertical blanking period
IT: imaging time
AT: time from the first communication timing 404 to the timing 405
ET: exposure time
DT: delay time from the center of the exposure period to the exposure centroid timing 406

The exposure centroid timing 406 with respect to the timing 405 is calculated on the basis of the center of the exposure period by "IT+BT−ET/2+DT."

The center position of a parallelogram in each frame corresponds to the exposure centroid timing 406, and the area of the parallelogram decreases with a decrease in exposing light intensity. At a time point (the right top point of the parallelogram) at which the exposure time ET elapses from the exposure start time point (the left top point of the parallelogram), signal reading of the imaging element is started.

The first communication 401 is performed from the camera body to the lens device with a vertical synchronization signal of the imaging unit 115 as a trigger. The first communication 401 serves as a reference for transmitting the exposure centroid timing 406 from the camera body to the lens device. The lens device acquires a timer time in the lens device at the timing at which information is received by the first communication 401 and sets the time as a reference time for calculating the exposure centroid timing. Regarding the communication timing 404 of the first communication 401, the communication may be performed at the same timing as the vertical synchronization signal or may be performed at a time point previous or subsequent to the vertical synchronization signal by an arbitrary time. For each frame, the communication is performed with a predetermined time difference from the synchronization signal. The first communication timing 404 is set to a timing not overlapping other communication. In the example illustrated in FIG. 4, the first communication timing 404 is set to a time point prior (previous) to the vertical synchronization signal.

Second communication 402 from the camera body to the lens device is performed. In the second communication 402, information on a relative time 407 from the first communication timing 404 with the first communication 401 as a reference is transmitted to the lens device. In the second communication 402, the movable range for electronic image blurring correction B at a current focal distance is transmitted. The communication timing of the second communication 402 is set to after the timing 405 at which the exposure time of each frame in which the exposure centroid is transmitted is determined. Accordingly, even when the exposure time of each frame is changed, the accurate exposure centroid timing 406 can be transmitted to the lens device. The exposure centroid timing 406 is calculated on the basis of the determined exposure time and the signal reading time of the imaging element and the relative time 407 is calculated on the basis of the difference from the communication timing 404 of the first communication 401. That is, the relative time 407 is calculated by "AT+IT+BT−ET/2+DT." The timing 405 at which the exposure time of each frame is determined is not fixed.

The lens device receives information on the relative time 407 by the second communication 402 with respect to the receiving timing of the first communication 401. Accordingly, the exposure centroid timing 406 can be found out by setting the timer in the lens device. Since the lens device receives the movable range for electronic image blurring correction B by the second communication 402, the coefficient K which is used by the splitting unit 205 can be calculated to include the movable range for optical image blurring correction A of the lens device. In the lens device, the exposure centroid timing 406, the lens shake detecting unit 110 detects shake information and the splitting unit 205 splits the entire degree of image blurring correction into the degree of optical image blurring correction in the lens device and the degree of electronic image blurring correction in the camera body. The lens control unit 111 stores the split degree of electronic image blurring correction until a communication request is received from the camera control unit 124.

Third communication 403 from the camera body to the lens device is performed. In the third communication 403, the lens control unit 111 transmits the split degree of electronic image blurring correction to the camera control unit 124 in response to a communication request from the camera control unit 124. The communication timing of the third communication 403 is set to after the exposure centroid timing 406. Since the camera control unit 124 knows the exposure centroid timing 406 in advance, communication is performed at an arbitrary timing after the exposure centroid timing. In the camera body, the degree of electronic image blurring correction received from the lens control unit 111 is sent to the electronic image blurring correction control unit 123 and the electronic image blurring correction setting unit 306 finally sets the degree of correction.

The first to third communications are performed for each frame and the camera control unit 124 transmits the reference time to the lens control unit 111 by the first communication 401. The camera control unit 124 transmits the relative time from the reference time and the movable range for electronic image blurring correction by the second communication 402. By the third communication 403, the camera control unit 124 acquires the degree of electronic image blurring correction from the lens control unit 111. On the other hand, for each frame, the lens control unit 111 acquires the reference time by the first communication 401, acquires the relative time 407 from the reference time and the movable range for electronic image blurring correction in the second communication, and splits the degree of electronic image blurring correction at the exposure centroid timing 406. The split degree of electronic image blurring correction is transmitted from the lens control unit 111 to the camera control unit 124 by the third communication 403.

Figure 5:
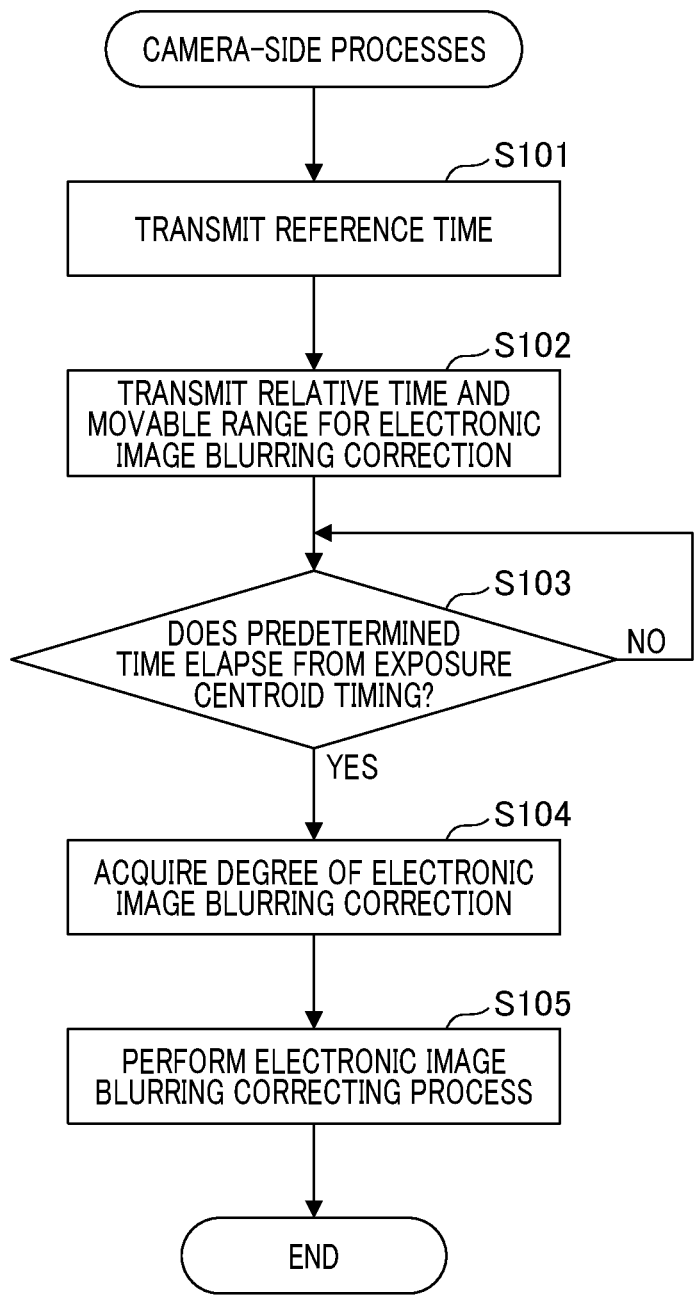
FIG. 5 is a flowchart illustrating communication and control of a camera body in the first embodiment.
Figure 6:
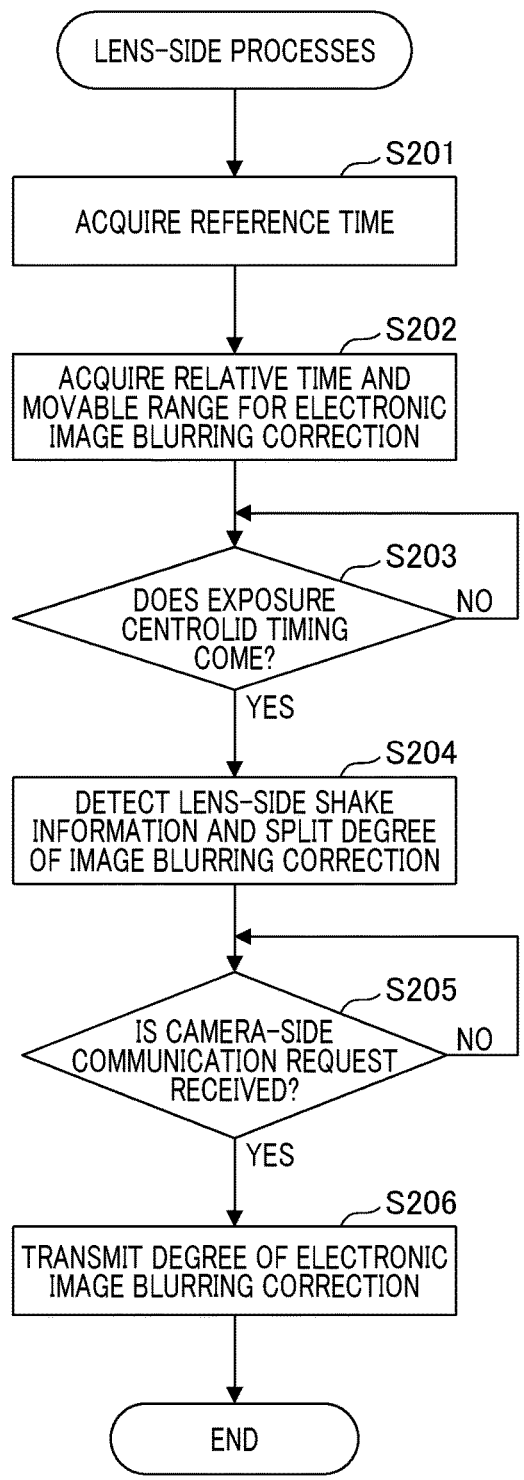
FIG. 6 is a flowchart illustrating communication and control of a lens device in the first embodiment.

Processes in this embodiment will be described below with reference to FIGS. 5 and 6. FIG. 5 is a flowchart illustrating details of communication and control which are performed by the camera control unit 124. FIG. 6 is a flowchart illustrating details of communication and control which are performed by the lens control unit 111. The following processes are realized in accordance with a predetermined program which is read from a memory and executed by the CPUs of the control units.

The main constituent of the process flow illustrated in FIG. 5 is the camera control unit 124, and a communication process with the lens control unit 111 is performed via the camera communication control unit 125 and the lens communication control unit 112. In S101, the camera control unit 124 performs the first communication 401 with the lens control unit 111. The first communication timing serves as the reference time for the exposure centroid timing 406. Then, in S102, the second communication 402 is performed. By transmitting the relative time 407 from the reference time in the first communication 401, the exposure centroid timing 406 is transmitted. The movable range for electronic image blurring correction at the current focal distance is transmitted.

In S103, the camera control unit 124 determines whether a predetermined time elapses from the exposure centroid timing 406. The predetermined time is a preset time from the exposure centroid timing 406. If the predetermined time elapses from the exposure centroid timing 406, the process flow moves to S104. If the predetermined time does not elapse, the process flow is returned to S103 and the processes are repeated. The reason why the elapse of the predetermined time is waited for in S103 is that the camera control unit 124 transmits a communication request to the lens control unit 111 in a state in which the lens control unit 111 completes the control process at the exposure centroid timing 406.

In S104, the camera control unit 124 performs the third communication and acquires the degree of electronic image blurring correction split by the lens control unit 111 at the exposure centroid timing 406. In S105, the camera control unit 124 instructs the electronic image blurring correction control unit 123 to perform the image blurring correcting operation on the basis of the degree of electronic image blurring correction acquired in S104.

The main constituent of the process flow illustrated in FIG. 6 is the lens control unit 111 and a communication process with the camera control unit 124 is performed via the lens communication control unit 112 and the camera communication control unit 125. In S201, the lens control unit 111 receives the first communication 401. The process of acquiring the timer time in the lens device is performed at the first communication timing 404 and the acquired time serves as the reference time for calculating the exposure centroid timing.

Then, in S202, the lens control unit 111 receives the second communication 402 and acquires the relative time 407 from the reference time at the first communication timing 404 and the movable range for electronic image blurring correction. Since the lens control unit 111 receives the reference time at the first communication timing 404, the lens control unit 111 receives the relative time 407 by the second communication and sets the exposure centroid timing by setting the timer. The lens control unit 111 acquires the movable range for electronic image blurring correction. The coefficient K is calculated using the movable range and the movable range for optical image blurring correction of the lens device together, and the degrees of correction for the optical image blurring correction and the electronic image blurring correction are set.

In S203, the lens control unit 111 determines whether the exposure centroid timing set by the timer in S202 comes. If the exposure centroid timing 406 comes, the process flow moves to S204. If the exposure centroid timing 406 does not come, the determination process of S203 is repeatedly performed.

In S204, the lens control unit 111 acquires shake information from the lens shake detecting unit 110 at the exposure centroid timing 406 and the splitting unit 205 splits the entire degree of image blurring correction into the degree of optical image blurring correction and the degree of electronic image blurring correction depending on the value of the coefficient K. The lens control unit 111 temporarily stores the split degree of electronic image blurring correction until a communication request is received from the camera control unit 124.

In S205, the lens control unit 111 determines whether a communication request for the third communication 403 is received from the camera control unit 124. If the communication request for the third communication is received, the process flow moves to S206. If the communication request is not received, the determination process of S205 is repeatedly performed. In S206, the lens control unit 111 receives the third communication and transmits the degree of electronic image blurring correction split in S204 to the camera control unit 124.

In this embodiment, the timing information on the exposure period is not transmitted by one communication, but the reference time and the relative time are transmitted from the camera body to the lens device by the first and second communications. Accordingly, even when the communication timing of the second communication is irregular due to an influence of other communication, the reference time by the first communication and the relative time by the second communication are transmitted to the lens device and it is thus possible to transmit the accurate exposure centroid timing to the lens device.

Even when the first communication overlaps other communication and is delayed, it is possible to set the relative time by the second communication in consideration of the delay time at the start time of the first communication. That is, the exposure centroid timing can be transmitted using the information on the relative time corrected on the basis of the delay time. Accordingly, even when the communication timing of the first communication is irregular, a more accurate exposure centroid timing can be transmitted from the camera body to the lens device.

The movable range for electronic image blurring correction or the degree of electronic image blurring correction is transmitted as angle-converted data. The camera control unit 124 transmits the movable range for electronic image blurring correction to the lens control unit 111 and acquires the degree of electronic image blurring correction from the lens control unit 111. According to this embodiment, it is possible to provide an image pickup system in which the optical image blurring correction and the electronic image blurring correction can be controlled in cooperation with a smaller communication traffic without recognizing individual lens and camera specifications in the interchangeable lens type image pickup system and the range of image blurring correction can be extended.

(Second Embodiment)

A second embodiment of the present invention will be described below. In this embodiment, the same elements as in the first embodiment will be referenced by the same numerical references and description thereof will not be repeated. Differences therebetween will be mainly described below. This non-repetition of the same description is true of embodiments to be described later.

In the first embodiment, the camera control unit 124 first transmits the timing information on the exposure period to the lens control unit 111 and then acquires the degree of electronic image blurring correction split at the exposure centroid timing by the lens control unit 111. In this embodiment, by performing correction in the correction axis direction (the roll direction) other than the split target using the detection result of the camera shake detecting unit 122, it is possible to further enhance the image blurring correction effect.

Figure 7:
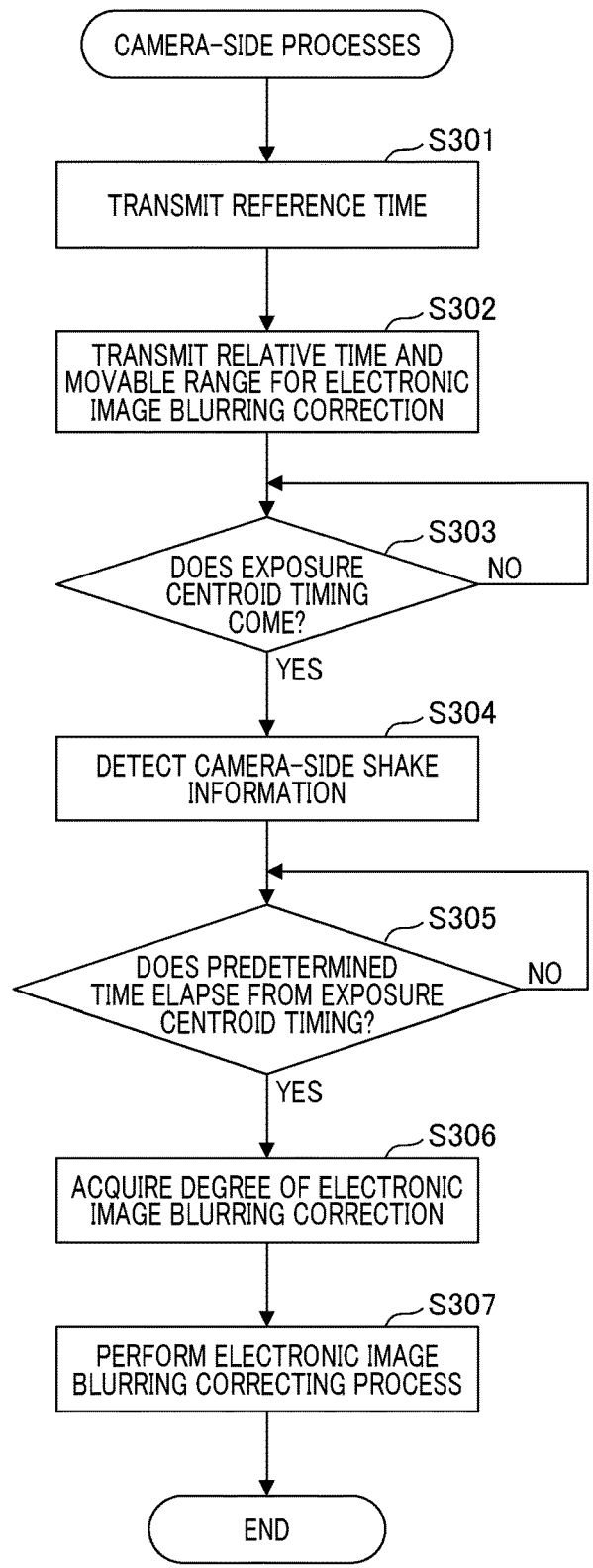
FIG. 7 is a flowchart illustrating communication and control of a camera body in a second embodiment.

Control details in this embodiment will be described below with reference to the flowchart illustrated in FIG. 7. In FIG. 7, a control example including a communication process and a shake detecting process in the camera body is illustrated. First, in S301, the camera control unit 124 performs first communication with the lens control unit 111 via the camera communication control unit 125. The time at the first communication timing serves as the reference time of the exposure centroid timing.

Then, in S302, the camera control unit 124 performs second communication via the camera communication control unit 125. A process of transmitting the relative time from a reference time with the first communication as the reference time to transmit the exposure centroid timing and transmitting the movable range for electronic image blurring correction at a current focal distance is performed.

In S303, the camera control unit 124 determines whether the exposure centroid timing comes in by setting a timer. If it is determined that the exposure centroid timing comes, the process flow moves to S304. If it is determined that the exposure centroid timing does not come, the determination process of S303 is repeatedly performed. In S304, the camera control unit 124 acquires the shake information on the camera body which is detected by the camera shake detecting unit 122 at the exposure centroid timing. The shake information detected herein is shake information on a correction axis other than the correction axis relevant to the degree of electronic image blurring correction to be acquired from the lens control unit 111 in S306, that is, detection information on a sensor having a different detection direction.

In S305, the camera control unit 124 determines whether a predetermined time elapses from the exposure centroid timing. The process flow moves to S306 if it is determined that the predetermined time elapses from the exposure centroid timing, and the determination process of S305 is repeatedly performed if the predetermined time does not elapse. The reason why the elapse of the predetermined time is waited for in S305 is the same as described in S103 of FIG. 5. In S306, the camera control unit 124 performs third communication with the lens control unit 111 via the camera communication control unit 125. The camera control unit 124 acquires the degree of electronic image blurring correction split at the exposure centroid timing by the lens control unit 111. In S307, the camera control unit 124 instructs the electronic image blurring correction control unit 123 to perform the image blurring correction control. The electronic image blurring correction control unit 123 performs the image blurring correction on the basis of the shake information on the camera body detected in S304 and the degree of electronic image blurring correction acquired in S306.

In this embodiment, the degree of electronic image blurring correction split by the lens control unit 111 and the shake information on the camera body are acquired and the image blurring correction control is performed. The degree of electronic image blurring correction is a degree of correction in the pitch direction and the yaw direction, and the shake information on the camera body is shake detection information in a correction axis direction (the roll direction) other than the split target. Accordingly, since the electronic image blurring correction in three-axis directions is performed, it is possible to further enhance the image blurring correction effect.

(Third Embodiment)

A third embodiment of the present invention will be described below. In the first embodiment, the camera control unit 124 transmits the exposure centroid timing and the movable range for electronic image blurring correction to the lens control unit 111. The lens control unit 111 transmits the split degree of electronic image blurring correction to the camera control unit 124. In this embodiment, the lens control unit 111 simultaneously transmits position information on the optical image blurring correction to the camera control unit 124 at the timing at which the degree of electronic image blurring correction is transmitted. Accordingly, since setting of a correction center of the electronic image blurring correction, tilt correction, or the like can be performed, it is possible to further enhance the image blurring correction effect.

Figure 8:
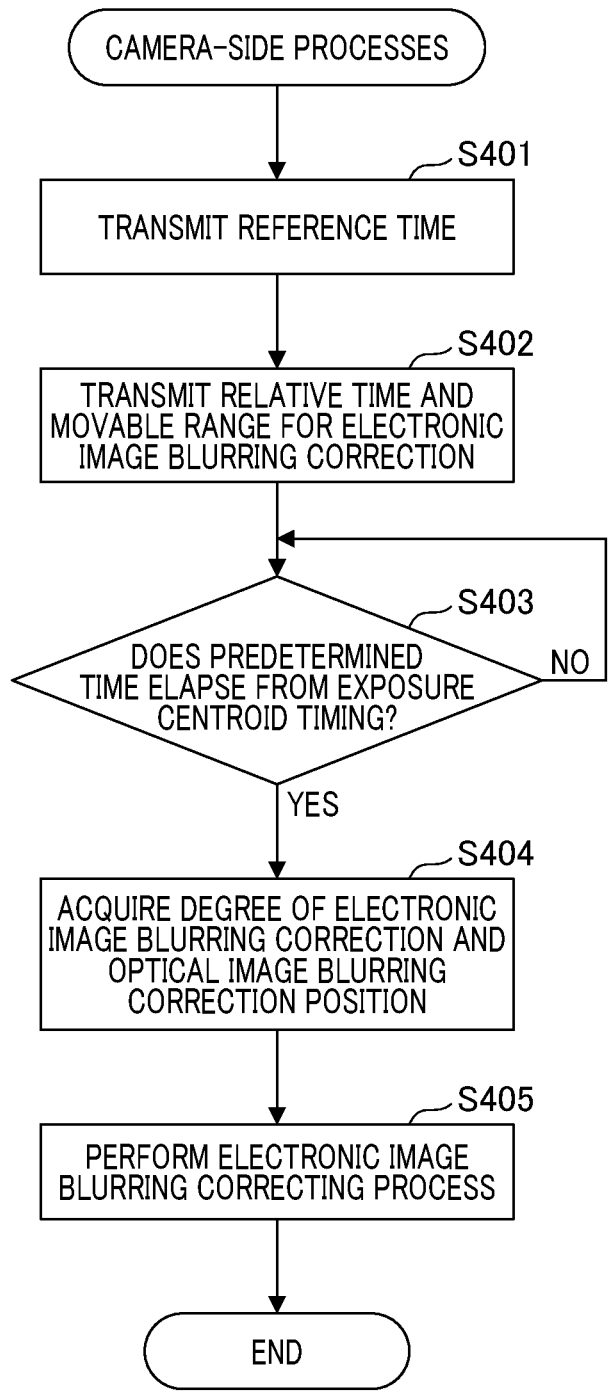
FIG. 8 is a flowchart illustrating communication and control of a camera body in a third embodiment.

Control details in this embodiment will be described below with reference to the flowchart illustrated in FIG. 8. The processes of S401 to S403 are the same as the processes of S101 to S103 in FIG. 5 and thus description thereof will not be repeated. The processes of S404 and S405 will be described below.

In S404, the camera control unit 124 performs third communication with the lens control unit 111. The camera control unit 124 acquires the degree of electronic image blurring correction split at the exposure centroid timing by the lens control unit 111 and the position information on the image blurring correcting unit 105 at the exposure centroid timing. Then, in S405, the camera control unit 124 instructs the electronic image blurring correction control unit 123 to perform the image blurring correction on the basis of the degree of electronic image blurring correction and the position information on the image blurring correcting unit 105 acquired in S404. Since the correction center of the electronic image blurring correction can be set to the optical axis using the position information on the image blurring correcting unit 105, it is possible to more accurately perform correction. The degree of optical image blurring correction can be seen from the position information on the image blurring correcting unit 105. Accordingly, it is possible to further enhance the image blurring correction effect by performing the tilt correction or the like in addition to the degree of electronic image blurring correction.

Figure 9:
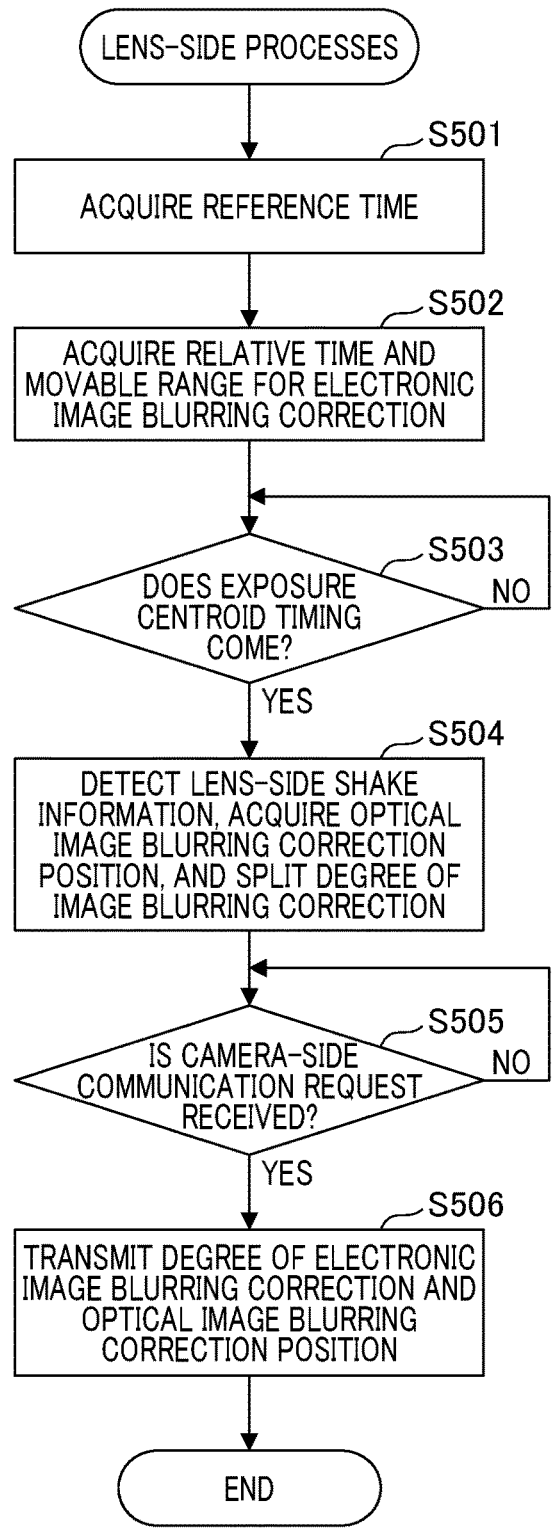
FIG. 9 is a flowchart illustrating communication and control of a lens device in the third embodiment.

FIG. 9 is a flowchart illustrating details of communication and control including a correction position of the optical image blurring correction in the lens device. The processes of S501 to S503 are the same as the processes of S201 to S203 in FIG. 6 and thus description thereof will not be repeated. The processes of S504 to S506 will be described below.

In S504, the lens control unit 111 acquires shake information from the lens shake detecting unit 110 at the exposure centroid timing and acquires the position of the image blurring correcting unit 105 from the position detecting unit 209. The splitting unit 205 splits the entire degree of image blurring correction into the degree of optical image blurring correction and the degree of electronic image blurring correction. The lens control unit 111 temporarily stores the split degree of electronic image blurring correction and the detected position information on the image blurring correcting unit 105 until a communication request is received from the camera control unit 124.

In S505, the lens control unit 111 determines whether a communication request for the third communication is received from the camera control unit 124. If the communication request for the third communication is received, the process flow moves to S506. If the communication request for the third communication is not received, the determination process of S505 is repeatedly performed. In S506, the lens control unit 111 receives the communication request for the third communication via the lens communication control unit 112 and transmits the degree of electronic image blurring correction split in S504 and the detected position information on the image blurring correcting unit 105 to the camera control unit 124.

In this embodiment, the lens control unit transmits the position information on the optical image blurring correction to the camera control unit at the timing at which the degree of electronic image blurring correction is transmitted. According to this embodiment, it is possible to further enhance the image blurring correction effect by performing setting of the correction center of the electronic image blurring correction, the tilt correction, and the like.

(Fourth Embodiment)

In a fourth embodiment of the present invention, application to rolling shutter distortion (hereinafter referred to as RS distortion) correction will be described below as other electronic correction.

An exposure type of the imaging unit 115 includes a global shutter type and a rolling shutter type. In a global shutter type device such as a charge coupled device (CCD) image sensor, an exposure time and an exposure start time in pixels are substantially constant in one frame image. In a device including a complementary metal oxide semiconductor (CMOS) image sensor, the exposure type is the rolling shutter type.

In the rolling shutter type in which the exposure timing differs depending on pixel lines, image distortion (RS distortion) due to differences in the exposure timing and the signal reading time between the lines occurs. A shake of the image pickup apparatus affects signal reading by lines to cause the RS distortion. When the image pickup apparatus is installed in a tripod or the like but vibration is applied to the device due to disturbance such as wind, RS distortion occurs. The RS distortion is distortion which occurs in a captured image due to a difference in the exposure timing between the pixels lines and thus can be corrected using a degree of movement of each pixel line as a degree of correction on the basis of a shake signal of the image pickup apparatus.

Figure 15:
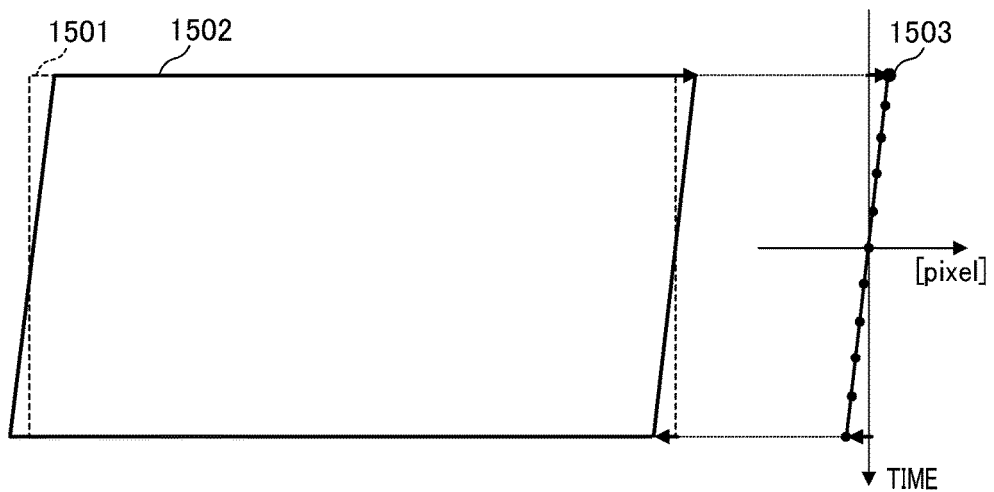
FIG. 15 is a conceptual diagram of rolling shutter distortion correction.

RS distortion correction will be described below with reference to the conceptual diagram illustrated in FIG. 15. On the assumption that the image pickup apparatus moves in the horizontal direction, an image 1501 before the RS distortion occurs (a dotted rectangular frame) and an image 1502 after the RS distortion occurs (a solid parallelogram frame) are illustrated. On the right side, a degree of movement (a degree of shake) in the horizontal direction of the image pickup apparatus is indicated by a plurality of points 1503. The horizontal axis represents the pixel position and the vertical axis corresponds to the time axis. In the example, 11 points are illustrated.

In the image pickup apparatus, a degree of movement (a degree of shake) in the horizontal direction of the device which is caused in the exposure period is calculated at a plurality of points. By interpolating the plurality of points, the degree of movement of each line is acquired as a degree of correction, and a correction process of the shake in the horizontal direction is performed by changing the reading position for each line. That is, the lens shake detecting unit 110 (see FIG. 2) detects a shake which causes the RS distortion. The image signal processing unit 117 electronically corrects the RS distortion. The calculating of the degree of correction for correcting the RS distortion is performed by the splitting unit 205 similarly to the degree of image blurring correction, and the degree of image blurring correction is multiplied by the coefficient "1−K." The camera communication control unit 125 (see FIG. 3) acquires the degree of RS distortion correction from the lens device. The pixel converting unit 301 converts the degree of electronic image blurring correction transmitted with conversion into an angle into a pixel-converted value. The conversion coefficient used herein has a value varying depending on the focal distance and is changed whenever the focal distance is changed. The limiter 305 clamps the degree of RS distortion correction within a movable range for RS distortion correction. A limit value in each correction-axis direction is set. The electronic image blurring correction setting unit 306 sets the degree of RS distortion correction in each correction-axis direction.

Figure 10:
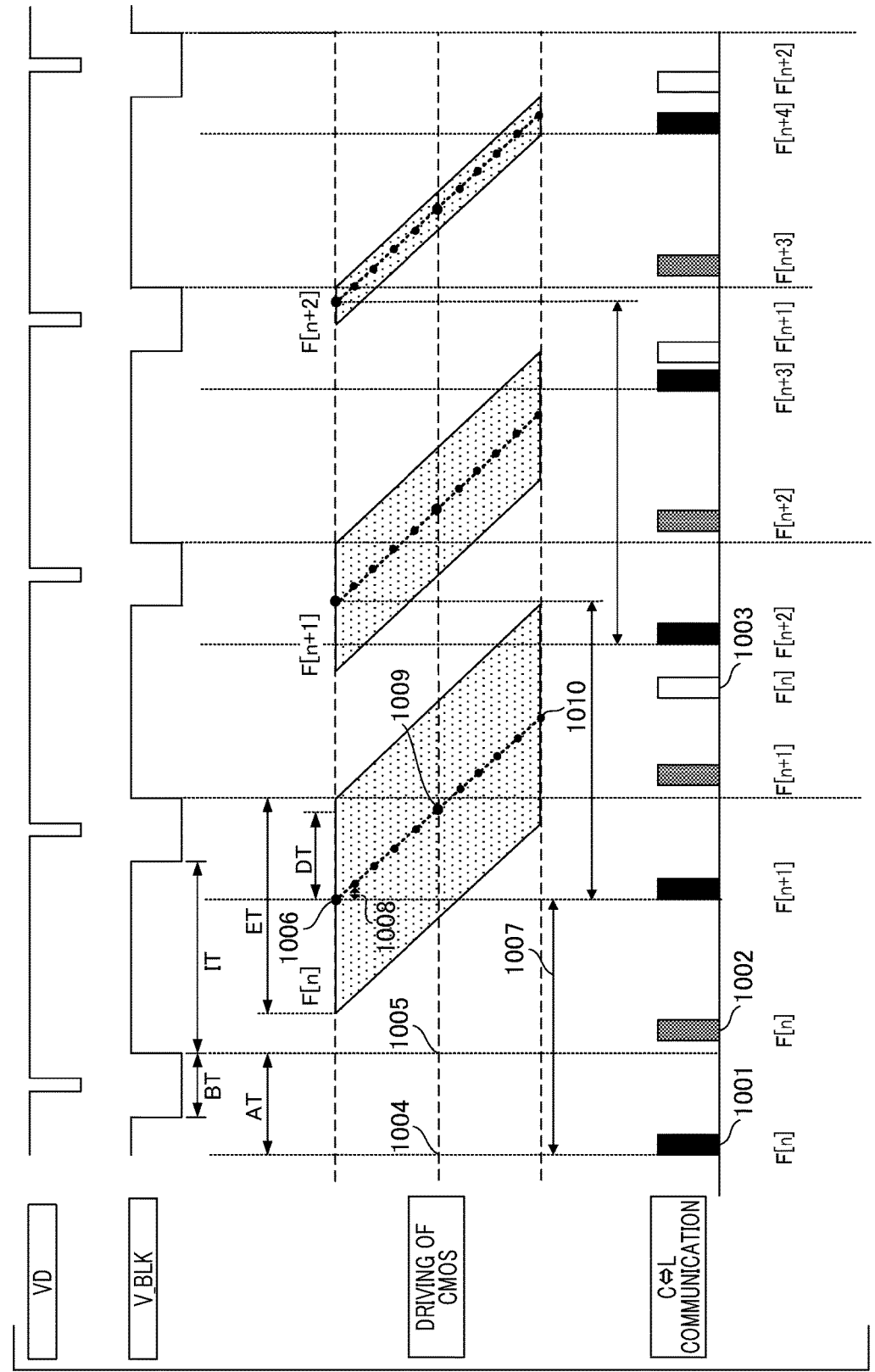
FIG. 10 is a diagram illustrating communication and timings thereof in a fourth embodiment.

Communication for RS distortion correction which is performed between the lens communication control unit 112 and the camera communication control unit 125 and a timing thereof will be described below with reference to FIG. 10. VD, V_BLK, and the like are the same as illustrated in FIG. 4. In order to perform the RS distortion correction, it is necessary to transmit an exposure centroid timing 1009 of the imaging unit 115 from the camera body to the lens device. Since a plurality of correction points are used in the RS distortion correction, the first correction timing and the time difference between the correction points are transmitted. In this embodiment, in order to avoid irregularity of the communication timing, the communication is performed in two times of a reference time and a relative time. In FIG. 10, first communication 1001 is indicated by a communication timing 1004. A second communication 1002 is performed after a timing 1005 at which the exposure time of each frame of which the exposure centroid is transmitted is determined. A process of transmitting a first correction timing 1006 for the RS distortion correction is performed. The lens control unit 111 performs the control as a main constituent and performs the communication using the angle-converted data for the RS distortion correction.

With the vertical synchronization signal (see VD) of the imaging unit 115 as a trigger, the camera control unit 124 performs the first communication 1001 with the lens control unit 111. The time at the first communication timing 1004 serves as the reference time for transmitting the first correction timing 1006 for the RS distortion correction from the camera control unit 124 to the lens control unit 111. The lens control unit 111 acquires an internal timer time at a timing at which the first communication 1001 is received, and sets the acquired time as the reference time for calculating the first correction timing of the RS distortion correction. The communication timing 1004 of the first communication 1001 may be set to the same timing as the vertical synchronization signal or may be set to a time point previous or subsequent to the vertical synchronization signal by an arbitrary time. Here, it is assumed that the communication is performed with a predetermined time difference from the vertical synchronization signal for each frame. It is preferable that the first communication timing 1004 be a timing not overlapping other communication. In the example illustrated in FIG. 10, the communication timing 1004 of the first communication 1001 is set to a time point previous to the vertical synchronization signal.

Then, the camera control unit 124 performs the second communication 1002. In the second communication 1002, the relative time 1007 from the reference time is transmitted to the lens control unit 111 with the time in the first communication 1001 as the reference time. The time difference 1008 is a time difference between the correction points for the RS distortion correction. The camera control unit 124 transmits the time difference 1008 between the correction points for the RS distortion correction and the movable range for electronic image blurring correction B at the current focal distance to the lens control unit 111. The second communication 1002 is performed after the timing 1005 at which the exposure time for each frame in which the first correction timing 1006 for the RS distortion correction is transmitted is determined. Accordingly, even when the exposure time for each frame is changed, the accurate first correction timing 1006 for the RS distortion correction can be transmitted. The first correction timing 1006 for the RS distortion correction is calculated from the determined exposure time and the signal reading time of the imaging element, and the relative time 1007 is calculated by the difference from the reference time in the first communication 1001.

The lens control unit 111 acquires the reference time already at the timing at which the first communication 1001 is received. Accordingly, by acquiring the relative time 1007 in the second communication 1002, the lens control unit 111 can set the first correction timing 1006 for the RS distortion correction by setting the internal timer. By acquiring the movable range for electronic image blurring correction B, the lens control unit 111 can calculate the coefficient K which is used by the splitting unit 205 using the movable range for optical image blurring correction A of the lens device together. The lens control unit 111 acquires the shake information from the lens shake detecting unit 110 at the first correction timing 1006 for the RS distortion correction. The splitting unit 205 multiplies the degree of image blurring correction by the coefficient "1−K" and calculates the degree of RS distortion correction. The lens control unit 111 stores the degree of RS distortion correction until a communication request from the camera control unit 124 is received.

The lens control unit 111 sets a next RS distortion correction timing by setting the internal timer. In setting the next RS distortion correction timing, the lens control unit 111 uses the current RS distortion correction timing and the time difference 1008 between the correction points for the RS distortion correction. The setting of the timer is repeatedly performed until all the RS distortion correction timings pass. In FIG. 10, since the correction points for the RS distortion correction include 11 points, the sixth correction point at the first correction timing 1006 corresponds to the exposure centroid. That is, the timing information on the exposure period includes information on the exposure centroid timing 1009. At the exposure centroid timing 1009, the lens control unit 111 acquires the degree of electronic image blurring correction.

Finally, the camera control unit 124 performs third communication 1003 with the lens control unit 111. In the third communication 1003, the lens control unit 111 receives a communication request from the camera control unit 124 and transmits the stored degree of RS distortion correction. The communication timing of the third communication 1003 is set after a final correction timing 1010 for the RS distortion correction. The final correction timing 1010 corresponds to the eleventh correction point. Since the camera control unit 124 knows the RS distortion correction timing in advance, the communication is performed at an arbitrary timing after the final correction timing 1010 for the RS distortion correction. The camera control unit 124 sends the degree of RS distortion correction acquired from the lens control unit 111 to the electronic image blurring correction control unit 123 and finally sets the degree of RS distortion correction in the electronic image blurring correction setting unit 306.

The first to third communications are performed for each frame, the camera control unit 124 transmits the reference time in the first communication 1001, transmits the relative time from the reference time and the movable range for electronic image blurring correction in the second communication 1002, and receives the degree of RS distortion correction in the third communication 1003. The lens control unit 111 acquires the reference time in the first communication 1001 and acquires the first correction timing for the RS distortion correction based on the relative time from the reference time and the movable range for electronic image blurring correction in the second communication 1002. The lens control unit 111 calculates the degree of correction at each RS distortion correction timing and transmits the calculated degree of correction to the camera control unit 124 in the third communication 1003.

Figure 11:
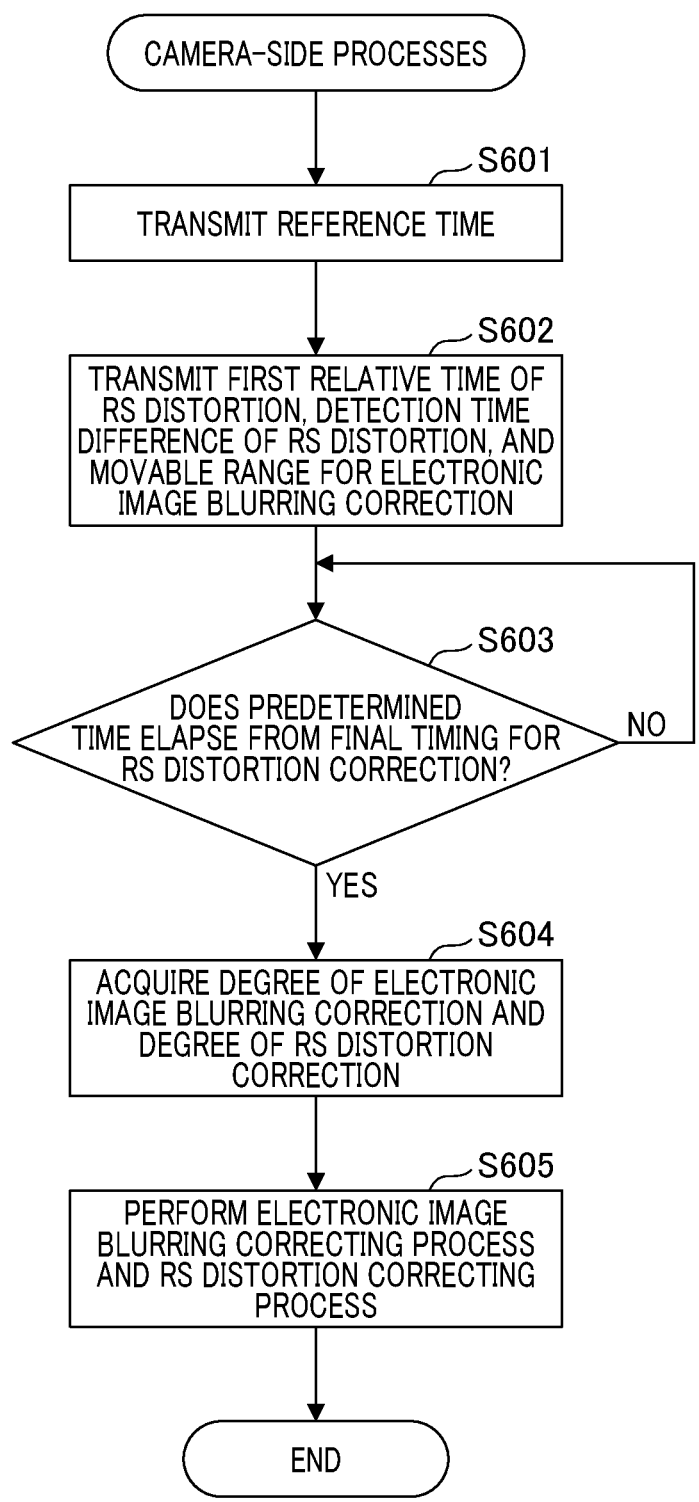
FIG. 11 is a flowchart illustrating communication and control of a camera body in the fourth embodiment.

Details of communication and control including the RS distortion correction which are performed by the camera control unit 124 will be described below with reference to the flowchart illustrated in FIG. 11. First, in S601, the camera control unit 124 performs first communication with the lens control unit 111 via the camera communication control unit 125. The time in the first communication serves as the reference time of the first correction timing 1006 for the RS distortion correction. Then, in S602, the camera control unit 124 performs second communication with the lens control unit 111 via the camera communication control unit 125. With the time in the first communication as the reference time, the relative time 1007 from the reference time is transmitted and the first correction timing 1006 for the RS distortion correction is transmitted to the lens control unit 111. The camera control unit 124 transmits the time difference between the correction points for the RS distortion correction and the movable range for electronic image blurring correction at the current focal distance to the lens control unit 111.

In S603, the camera control unit 124 determines whether a predetermined time elapses from the final correction timing 1010 for the RS distortion correction. The predetermined time is a time which is set in advance. The process flow moves to S604 when the predetermined time elapses from the final correction timing 1010 for the RS distortion correction, and the determination process of S603 is repeatedly performed when the predetermined time does not elapse. The reason why the elapse of the predetermined time is waited for in S603 is that the camera control unit 124 transmits a communication request to the lens control unit 111 in a state in which the lens control unit 111 completely processes the final correction point for the RS distortion correction.

In S604, the camera control unit 124 performs third communication with the lens control unit 111 via the camera communication control unit 125. The camera control unit 124 acquires the degree of electronic image blurring correction split by at the exposure centroid timing 1009 by the lens control unit 111 and the degree of RS distortion correction at each of the plurality of correction points for the RS distortion correction. In S605, the camera control unit 124 instructs the electronic image blurring correction control unit 123 to correct an image on the basis of the degree of electronic image blurring correction and the degree of RS distortion correction which are acquired in S604.

Figure 12:
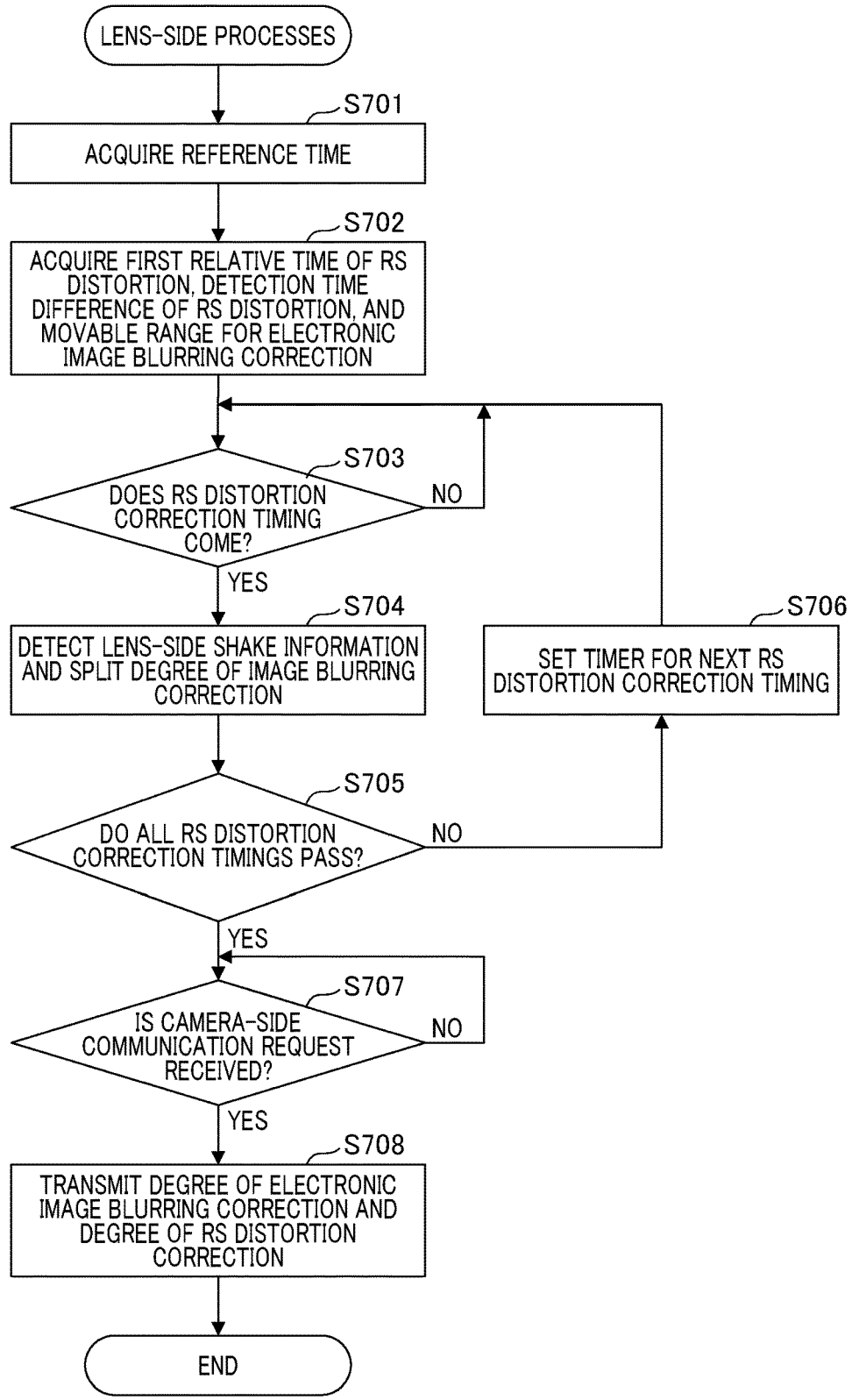
FIG. 12 is a flowchart illustrating communication and control of a lens device in the fourth embodiment.

Details of communication and control including the RS distortion correction which are performed by the lens control unit 111 will be described below with reference to the flowchart illustrated in FIG. 12. First, in S701, the lens control unit 111 receives the first communication from the camera control unit 124 via the lens communication control unit 112. The lens control unit 111 acquires the internal timer time at the first communication timing and sets the acquired time as the reference time for calculating the first correction timing for the RS distortion correction.

Then, in S702, the lens control unit 111 receives the second communication from the camera control unit 124 via the lens communication control unit 112. The lens control unit 111 acquires the relative time from the reference time in the first communication, the time difference between the correction points for the RS distortion correction, and the movable range for electronic image blurring correction. Since the time at the first communication timing 1004 is received as the reference time, the lens control unit 111 receives the relative time 1007 in the second communication 1002 and sets the first correction timing for the RS distortion correction by setting the internal timer. By receiving the movable range for electronic image blurring correction, the lens control unit 111 calculates and sets the coefficient K which is used by the splitting unit 205 using the movable range for optical image blurring correction of the lens device together.

In S703, the lens control unit 111 determines whether the RS distortion correction timing comes. The process flow moves to S704 when the RS distortion correction timing comes, and the determination process of S703 is repeatedly performed when the correction timing does not come. In S704, the lens control unit 111 acquires the shake information from the lens shake detecting unit 110 at the RS distortion correction timing. The splitting unit 205 calculates the degree of optical image blurring correction of the lens device and the degree of RS distortion correction. The lens control unit 111 temporarily stores the degree of RS distortion correction until a communication request is received from the camera control unit 124. When the correction points for the RS distortion correction include 11 points, the sixth correction point from the first correction point corresponds to the exposure centroid. The lens control unit 111 also acquires the degree of electronic image blurring correction at the exposure centroid timing 1009.

In S705, the lens control unit 111 determines whether all the RS distortion correction timings pass. The process flow moves to S707 when all the RS distortion correction timings pass, and the process flow moves to S706 when all the RS distortion correction timings do not pass. In S706, the lens control unit 111 sets a next RS distortion correction timing by setting the internal timer. In setting the next correction timing, the lens control unit 111 uses the current RS distortion correction timing and the time difference between the correction points for the RS distortion correction acquired in S702. After the timer is set, the process flow is returned to S703.

In S707, the lens control unit 111 determines whether a communication request for the third communication is received from the camera control unit 124 via the lens communication control unit 112. The process flow moves to S708 when the communication request for the third communication is received, and the determination process of S707 is repeatedly performed when the communication request is not received. In S708, the lens control unit 111 receives the third communication from the camera control unit 124 via the lens communication control unit 112. The lens control unit 111 transmits the degree of electronic image blurring correction split at the exposure centroid timing and the degree of RS distortion correction at each of the plurality of correction points for the RS distortion correction to the camera control unit 124.

In this embodiment, the first correction timing for the RS distortion correction and the time difference between the correction points for the RS distortion correction are transmitted from the camera control unit 124 to the lens control unit 111. The lens control unit 111 can calculate the timings of the correction points for the RS distortion correction and can acquire the degree of RS distortion correction. The degree of RS distortion correction is transmitted to the camera control unit to perform the RS distortion correction.

In this embodiment, the camera control unit performs the correction using the degree of RS distortion correction acquired from the lens control unit. Since the camera control unit performs the RS distortion correction in the correction-axis direction (the roll direction) other than the acquired axes, it is possible to further enhance the image blurring correction effect. In this embodiment, 11 points are exemplified as the correction points for the RS distortion correction. The number of correction points for the RS distortion correction does not have to be fixed to a predetermined number, and the number of correction points may be changed, for example, depending on the communication speed which can be coped with the lens device. In this case, the camera control unit acquires the communication speed which can be coped with by the communication with the lens device and transmits the number of correction points for the RS distortion correction to the lens control unit in the second communication. Accordingly, the number of correction points for the RS distortion correction which are acquired by the lens control unit is determined.

(Other Embodiments)

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-034984, filed Feb. 26, 2016, which is hereby incorporated by reference wherein in its entirety.

What is claimed is:

1. An image pickup system comprising:
a body of an image pickup apparatus; and
a lens device,
wherein the lens device includes lens, and at least one processor which function as:
a first communication unit configured to communicate with the body,
a detection unit configured to detect a shake,
a first correction unit configured to correct image blurring due to the shake, and a first control unit configured to acquire information on the shake detected by the detection unit and to control the first correction unit,
wherein the body includes
an image sensor, and at least one processor which function as:
a second communication unit configured to communicate with the lens device,
a second correction unit configured to correct image blurring due to the shake or image distortion, and
a second control unit configured to control the second correction unit,
wherein the second control unit performs control of transmitting timing information on an exposure period of the image sensor and information on a correction range which is used to correct the image blurring by the second correction unit to the first control unit via the second communication unit,
wherein the first control unit receives the timing information from the second control unit via the first communication unit, calculates a degree of correction in the first correction unit and a degree of correction in the second correction unit, and performs control of transmitting the degree of correction in the second correction unit to the second control unit, and
wherein the second control unit receives the degree of correction in the second correction unit from the first control unit via the second communication unit and controls the second correction unit.

2. An image pickup apparatus that communicates with a lens device, the lens device including a detection sensor configured to detect a shake, a first correction unit configured to correct image blurring due to the shake, and a first control unit configured to acquire information on the shake detected by the detection sensor and to control the first correction unit, the image pickup apparatus comprising:
an image sensor, and at least one processor which function as:
a second correction unit configured to correct image blurring due to the shake or image distortion; and
a second control unit configured to control the second correction unit,
wherein the second control unit performs control of transmitting timing information on an exposure period of the image sensor and information on a correction range which is used to correct the image blurring by the second correction unit to the first control unit,
wherein the first control unit receives the timing information calculates a degree of correction in the first correction unit and a degree of correction in the second correction unit, and performs control of transmitting the degree of correction in the second correction unit to the second control unit, and wherein the second control unit receives the degree of correction in the second correction unit and controls the second correction unit.

3. The image pickup apparatus according to claim 2, wherein the timing information on the exposure period includes information indicating an exposure centroid.

4. The image pickup apparatus according to claim 2, wherein the processor included in the body functions as a shake detecting unit configured to have a detection direction different from the detection sensor, wherein the second control unit acquires the degree of correction in the second correction unit and a degree of shake detected by the shake detecting unit and controls image blurring correction.

5. The image pickup apparatus according to claim 2, wherein the second control unit receives position information on the first correction unit which is detected by a position detecting unit of the lens device and controls image blurring correction.

6. The image pickup apparatus according to claim 2, wherein in control of correcting the image distortion at a plurality of correction points, the second control unit transmits information on the correction points to the first control unit and acquires a degree of correction of the image distortion from the first control unit.

7. The image pickup apparatus according to claim 6, wherein the information on the correction points includes information on a first correction timing in correcting the image distortion and information on a time difference between the correction points.

8. The image pickup apparatus according to claim 7, wherein the second control unit acquires information on a communication speed with the lens device, determines the number of correction points, and transmits the number of correction points to the first control unit.

9. The image pickup apparatus according to claim 2, wherein the second correction unit corrects the image blurring or the image distortion through image processing.

10. The image pickup apparatus according to claim 2, wherein the first control unit acquires information on the shake based on the received timing information.

11. A lens device that communicates with a body of an image pickup apparatus, the lens device includes lens and at least one processor which function as:

a detection unit configured to detect a shake,
a first correction unit configured to correct image blurring due to the shake, and
a first control unit configured to acquire information on the shake detected by the detection unit and to control the first correction unit,
wherein the first control unit receives timing information on an exposure period of an image sensor and information on a correction range which is used to correct the image blurring by a second correction unit from a second control unit of the image pickup apparatus, calculates and performs control of calculating a degree of correction in the first correction unit and a degree of correction in the second correction unit included in the image pickup apparatus, calculates a degree of correction in the second correction unit to the second control unit.

12. The lens device according to claim 11, wherein the timing information on the exposure period includes information indicating an exposure centroid.

13. The lens device according to claim 11, wherein the first control unit calculates the degree of correction in the first correction unit and the degree of correction in the second correction unit using the information on the correction range and the correction range which is used to correct the image blurring by the first correction unit.

14. The lens device according to claim 11, wherein the processor functions as a position detecting unit configured to detect a position of the first correction unit, wherein the first control unit performs control of transmitting information on the position detected by the position detecting unit to the second control unit.

15. The lens device according to claim 11, wherein in control of correcting the image distortion at a plurality of correction points, the first control unit receives information on the correction points from the second control unit and performs control of calculating a degree of correction of the image distortion and transmitting the degree of correction of the image distortion to the second control unit.

16. The lens device according to claim 15, wherein the information on the correction points includes information on a first correction timing in correcting the image distortion and information on a time difference between the correction points.

17. The lens device according to claim 15, wherein the first control unit receives the number of correction points from the second control unit and performs control of calculating a degree of correction of the image distortion at the correction points and transmitting the degree of correction of the image distortion to the second control unit.

18. The lens device according to claim 11, wherein the first correction unit corrects the image blurring by driving a lens.

19. A control method which is performed in an image pickup system including a lens device and a body of an image pickup apparatus, the lens device including a first communication unit configured to communicate with the body of the image pickup apparatus,
a detection unit configured to detect a shake,
a first correction unit configured to correct image blurring due to the shake, and
a first control unit configured to acquire information on the shake detected by the detection unit and to control the first correction unit,
the body including
an imaging unit,
a second communication unit configured to communicate with the lens device,
a second correction unit configured to correct image blurring due to the shake or image distortion, and
a second control unit configured to control the second correction unit,
the control method comprising:
transmitting, by the second control unit, timing information on an exposure period of the imaging unit to the first control unit via the second communication unit;
receiving, by the first control unit, the timing information from the second control unit via the first communication unit and information on a correction range which is used to correct the image blurring by the second correction unit;
calculating, by the first control unit, a degree of correction in the first correction unit and a degree of correction in the second correction unit, and to perform control of transmitting the degree of correction in the second correction unit to the second control unit via the first communication unit; and receiving, by the second control unit, the degree of correction in the second correction unit from the first control unit via the second communication unit and to control the second correction unit.

* * * * *